US012018512B2

(12) United States Patent
Eden et al.

(10) Patent No.: US 12,018,512 B2
(45) Date of Patent: Jun. 25, 2024

(54) LOCK SYSTEM WITH AUXILIARY PIN TUMBLER STACK

(71) Applicant: KABA ILCO CORP., Rocky Mount, CO (US)

(72) Inventors: Charles W. Eden, Lewisville, NC (US); Thomas H. Boone, Nashville, NC (US); Thomas Michael Phillips, Sr., Rocky Mount, NC (US)

(73) Assignee: KABA ILCO Corp., Rocky Mount, CO (US)

( * ) Notice: Subject to any disclaimer, the term of this patent is extended or adjusted under 35 U.S.C. 154(b) by 0 days.

(21) Appl. No.: 17/887,916

(22) Filed: Aug. 15, 2022

(65) Prior Publication Data

US 2023/0295955 A1 Sep. 21, 2023

Related U.S. Application Data

(63) Continuation of application No. 17/697,570, filed on Mar. 17, 2022, now Pat. No. 11,447,975.

(51) Int. Cl.
*E05B 27/00* (2006.01)
*E05B 19/00* (2006.01)

(52) U.S. Cl.
CPC ...... *E05B 27/0057* (2013.01); *E05B 19/0023* (2013.01); *E05B 19/0035* (2013.01); *E05B 19/0052* (2013.01); *E05B 27/0017* (2013.01); *E05B 27/0078* (2013.01); *E05B 27/0053* (2013.01); *E05B 27/0075* (2013.01)

(58) Field of Classification Search
CPC ............ E05B 19/0023; E05B 19/0035; E05B 19/0052; E05B 27/0017; E05B 27/0039; E05B 27/0042; E05B 27/0053; E05B 27/0057; E05B 27/0067; E05B 27/0075; E05B 27/0078
See application file for complete search history.

(56) References Cited

U.S. PATENT DOCUMENTS 3,175,379 A * 3/1965 Russell ................. E05B 27/005 70/378
3,190,093 A * 6/1965 Schlage ................ E05B 27/005 70/378
3,324,693 A * 6/1967 Check ..................... E05B 9/086 70/420
3,494,158 A * 2/1970 Bauer ................. E05B 27/0021 70/378
3,531,959 A 10/1970 Weber
4,107,966 A 8/1978 Schlage
4,120,184 A 10/1978 Gerlach
4,823,575 A 4/1989 Florian et al.
4,998,426 A * 3/1991 Genakis .............. E05B 27/0082 70/494
5,016,455 A 5/1991 Hennessy
5,222,383 A 6/1993 Fann et al.
(Continued)

*Primary Examiner* — Christopher J Boswell
(74) *Attorney, Agent, or Firm* — Faegre Drinker Biddle & Reath LLP

(57) ABSTRACT

Locking systems allow for the unlocking and locking of, e.g., doors, containers, and enclosures. Lock cylinders are coded to specific keys, and often there is a desire to have a key be able to access a subset of lock cylinders. Keys are coded using bitting to gain access to specific lock cylinders. It is with respect to these and other general considerations that embodiments have been described.

17 Claims, 14 Drawing Sheets

(56) References Cited

U.S. PATENT DOCUMENTS

| | | | | |
|---|---|---|---|---|
| 5,943,890 | A | 8/1999 | Field et al. | |
| 6,526,791 | B2 | 3/2003 | Shvarts | |
| 7,181,941 | B2 | 2/2007 | Eden, Jr. | |
| 7,207,200 | B2 | 4/2007 | Eden, Jr. et al. | |
| 7,392,676 | B2 | 7/2008 | Eden, Jr. | |
| 10,030,416 | B1 * | 7/2018 | Albertson | E05B 27/0017 |
| 10,316,547 | B2 | 6/2019 | Ulrich et al. | |
| 10,890,011 | B2 | 1/2021 | Anderson | |
| 11,447,975 | B1 * | 9/2022 | Eden | E05B 19/0052 |
| 2009/0178451 | A1 * | 7/2009 | Wu | E05B 27/0017 70/493 |
| 2021/0230901 | A1 | 7/2021 | Duckwall et al. | |
| 2022/0112741 | A1 * | 4/2022 | Nicoara | E05B 27/0078 |

* cited by examiner

LOCK SYSTEM WITH AUXILIARY PIN TUMBLER STACK

RELATED APPLICATIONS

This application is a continuation of U.S. patent application Ser. No. 17/697,570, filed Mar. 17, 2022, titled LOCK SYSTEM WITH KEY AND AUXILIARY PIN TUMBLER STACK, the entire disclosures of which are expressly incorporated by reference herein.

FIELD OF THE DISCLOSURE

The present invention relates to a locking system and methods of manufacture thereof.

BACKGROUND OF THE DISCLOSURE

Locking systems allow for the unlocking and locking of, e.g., doors, containers, and enclosures. Lock cylinders are coded to specific keys, and often there is a desire to have a key be able to access a subset of lock cylinders. Keys are coded using bitting to gain access to specific lock cylinders. It is with respect to these and other general considerations that embodiments have been described.

SUMMARY OF THE DISCLOSURE

In an embodiment of the present disclosure, a key is disclosed. The key comprising a bow, a blade extending longitudinally from the bow along a key blade centerline to a tip, and the blade having a pair of spaced upper and lower edges which are interconnected by opposite side faces. The blade also comprises a tapered upper protrusion disposed along the upper edge with a circular cross-section. The upper protrusion extends generally orthogonal to the key blade centerline, the upper protrusion positioned longitudinally intermediate the tip and the bow. The upper extent of the upper protrusion defines a first height relative to the key blade centerline. A slot is disposed adjacent the protrusion, the slot disposed longitudinally intermediate the protrusion and the bow. The bottom extent of the slot defines a second height relative to the key blade centerline and the first height is greater than the second height. A land abuts the protrusion, and the protrusion separates the land and the slot. The land defines a third height relative to the key blade centerline, and the third height is greater than the second height and less than the first height.

The blade further comprises irregular surfaces defining bitting, and the bitting is positioned longitudinally intermediate the protrusion and the tip. The key further comprises a lower protrusion positioned along the lower edge, and the lower protrusion is positioned generally opposite the upper protrusion. Further, the slot is defined by the bottom extent, a front wall extending upward to the protrusion, and a rear wall positioned between the front wall and the bow. The rear wall is substantially transverse the key blade centerline, and the rear wall has a rear wall width that is less than an upper edge width of the upper edge.

In another embodiment of the present disclosure, a key is disclosed. The key comprising a bow and a blade extending along a longitudinal axis of the blade from the bow to a tip. The blade has bitting operable to position a tumbler stack of a lock in an unlocked position relative to a first shear line and a protrusion positioned between the bitting and the bow along the longitudinal axis of the blade. The protrusion is operable to position an auxiliary tumbler in an unlocked position relative to a second shear line different from the first shear line. A slot is positioned intermediate the protrusion and the bow, and the blade includes a land positioned intermediate the bitting and the protrusion, and the land is spaced further from the longitudinal axis than a bottom of the slot. Further, the protrusion is a tapered protrusion with a circular cross-section.

In yet another embodiment of the present disclosure, a method of manufacturing a key is disclosed. The method comprising providing a key blank comprising a bow and a blade longitudinally extending from the bow along a key blade centerline to a tip. The blade has a pair of upper and lower edges which are interconnected by opposite side faces. The method further comprises milling the upper edge to create a protrusion intermediate the bow and tip, and removing, separate from the milling step, a portion of material on the upper edge at a position longitudinally intermediate the protrusion and the bow to create a slot.

The method further comprises further removing material to create irregularly shaped surfaces to define bitting at a position longitudinally intermediate the tip and the protrusion. Further, the removing step comprises the step of stamping out the portion of material. The method further comprises reducing the width of the upper edge of the blade. Further, the milling step also creates a ramped surface extending between the protrusion and the upper edge of the blade.

In yet another embodiment, a lock system is disclosed. A lock system comprising a plug comprising an auxiliary pin chamber and a keyway, the auxiliary pin chamber extending from a perimeter of the plug to meet the keyway. A shell is configured to receive the plug, and an interface between the shell and the plug defining a shear line, the shell comprising an auxiliary tumbler chamber. The auxiliary tumbler chamber aligns with the auxiliary pin chamber when the lock system is in a neutral position. The auxiliary tumbler comprises an auxiliary driver pin positioned at least partially in the auxiliary tumbler chamber of the shell. The auxiliary tumbler further comprises a headed pin, and the auxiliary driver pin is biased against the headed pin to a normally biased position of the auxiliary tumbler, and an auxiliary pin comprising an opening and a pin body, and the headed pin is received in the opening. When in the normally biased position, the auxiliary tumbler extends across the shear line to prevent rotation of the plug in the shell.

The lock system further comprises a key comprising a bow and a blade extending longitudinally from the bow along a key blade centerline to a tip. The kye comprises a protrusion extending from an upper edge of the blade and a slot, and the slot is sized to receive the pin body of the auxiliary pin. When the auxiliary pin body is positioned in the slot, the protrusion of the key is aligned with the opening in the auxiliary pin. Further, positioning the key so that the auxiliary pin is received in the slot of the key raises the auxiliary tumbler from the normally biased position. Further, with the auxiliary pin body positioned in the slot of the key, the protrusion of the key is positioned to actuate the headed pin relative to the auxiliary pin. Further, when the auxiliary pin body is received by the slot, a bottom of the headed pin contacts the protrusion of the key. Further, when the auxiliary pin body positioned in the slot of the key, the auxiliary tumbler is positioned to allow rotation of the plug relative to the shell. Further, the auxiliary driver pin is biased directly against the headed pin, and the pin body comprises a pair of extensions and a bridge extends between the extensions, the bridge having a bridge width. The pin body comprises a pair of extensions and a bridge extends between the extensions, the bridge having a bridge width, and the upper edge of the blade of the key comprises an upper edge width. The upper edge width is less than the bridge width. Further, the slot receives the bridge when the pin body is received in the slot.

In yet another embodiment, a lock system is disclosed. A lock system comprising a key with a bow, and a blade extending longitudinally from the bow along a key blade centerline to a tip. The blade comprises an upper edge, and the upper edge comprises bitting and a protrusion extending above the bitting. The protrusion is positioned intermediate the bitting and the bow, and a slot is disposed intermediate the protrusion and the bow. The protrusion extends to a height above the slot. The lock system further comprises an auxiliary pin including an opening and a pin body, and a headed pin. The headed pin is received within the auxiliary pin opening, and the headed pin and auxiliary pin moveable relative to one another. The lock system further comprises a plug comprising a keyway, and the keyway is sized and shaped to receive the blade of the key. The bitting of the key mates with a tumbler stack to unlock the lock system. The plug further comprising a chamber sized and shaped to receive the auxiliary pin and the headed pin. When the key is completely inserted into the keyway, and the protrusion contacts the headed pin and the auxiliary pin is received in the slot.

The lock system further comprises a shell, and the plug is received within the shell. When a proper key is completely inserted into the keyway, the plug is permitted to rotate relative to the shell. Further, the auxiliary pin comprises a body with a pair of extensions, and the pair of extensions are separated by a bridge having a bridge width. Further, the upper edge of the blade comprises an upper edge width and the upper edge with is nominally equal to, or less than, the width of the bridge width. The upper edge of the blade is configured to be received between the pair of extensions. Further, when the auxiliary pin body is positioned in the slot of the key, the protrusion of the key is positioned to actuate the headed pin relative to the auxiliary pin. When the auxiliary pin body is received by the slot, a bottom of the headed pin contacts the protrusion of the key. Further, with the auxiliary pin body positioned in the slot of the key, the auxiliary tumbler is positioned to allow rotation of the plug relative to the shell.

In yet another embodiment of the present disclosure, a group of locking systems is disclosed. The group comprising a first key comprising a first bow, and a first blade extending longitudinally from the first bow along a key blade centerline to a first tip. The first blade comprises an upper edge, and the first upper edge comprises a first upper edge width. The group further comprising a second key comprising a second bow, and a second blade extending longitudinally from the second bow along a key blade centerline to a tip. The second blade comprises an upper edge, and the second upper edge comprises a second upper edge width. The group further comprising a first plug comprising a first auxiliary tumbler chamber, and the first auxiliary tumbler chamber receiving a first auxiliary pin. The first auxiliary pin comprises a body comprising a pair of first extensions spaced by a first bridge having a first width. The first upper edge width nominally equal to, or less than, the first width. The first key is configured to be received between the first extensions. The group further comprising a second plug comprising a second auxiliary tumbler chamber, and the second auxiliary tumbler chamber receiving a second auxiliary pin. The second auxiliary pin comprises a body comprising a pair of second extensions spaced by a second bridge having a second width. The second upper edge width nominally equal to, or less than, the second width. The second key is configured to be received between the second extensions. Further, the first upper edge width is greater than the second width.

Further, the first key comprises a first slot with the upper edge, and the slot is positioned longitudinally intermediate the tip and the bow. Further, when the first key is completely inserted into the first plug, the first bridge is received by the first slot. The second key may be received by either of the first plug or the second plug. The first plug further comprises a set of pin chambers, wherein the upper extent of the first auxiliary tumbler chamber defines a first shear line, and the upper extent of the pin chambers defines a second shear line. Further, the first shear line is higher than the second shear line.

In yet another embodiment of the present disclosure a family of keys for operating locks is disclosed. The family of keys comprising a first key having a first key bitting sized and shaped to position a tumbler stack of a first lock in a first lock unlocked position, the first key having a first key width. A second key having a second key bitting sized and shaped to position a tumbler stack of a second lock in a second lock unlocked position, the second key having a second key width smaller than the first key width. The second key bitting is sized and shaped to position the tumbler stack of the first lock in the first lock unlocked position. The first key bitting also sized and shaped to position the tumbler stack of the second lock in the second lock unlocked position. The first lock has a first lock auxiliary tumbler stack and the second lock has a second lock auxiliary tumbler stack. The second lock auxiliary tumbler stack sized for actuation by the second key width and sized to block actuation by the first key width. The first lock auxiliary tumbler stack sized for actuation by the first key width and for actuation by the second key width. The second key is operable to actuate the first lock to the first lock unlocked position. The second key is further operable to actuate the second lock to the second lock unlocked position. The first key is operable to actuate the first lock to the first lock unlocked position but not operable to actuate the second lock to the second lock unlocked position.

Further, the first key includes a first bow and a first blade extending longitudinally from the first bow along a first key blade centerline to a first tip. Further, an upper protrusion is positioned along an upper edge of the key blade, the protrusion positioned intermediate the tip and the bow. The first key further comprises a first slot within the upper edge, and the slot is positioned longitudinally intermediate the upper protrusion and the bow. Further, the first lock auxiliary tumbler stack includes an auxiliary pin including a pin body, the pin body including a bridge to be received by the slot. The first lock further includes a first plug and the first lock auxiliary tumbler stack includes an auxiliary tumbler chamber located in the first plug. The first plug includes a set of pin chambers and the upper extent of the first auxiliary tumbler chamber defines a first shear line. An upper extent of the pin chambers defines a second shear line, and the first shear line is higher than the second shear line. The first lock auxiliary tumbler stack further comprises a first auxiliary pin with a first bridge width, and the second lock auxiliary tumbler stack comprises a second auxiliary pin with a second bridge with. The second key has an upper key width that is smaller than the first bridge width and the second bridge width.

In yet another embodiment of the present disclosure, a key is disclosed. A key comprising a blade extending longitudinally from the bow along a key blade centerline to a tip. The blade has a pair of spaced upper and lower edges which are interconnected by opposite side faces. The blade comprises a tapered upper protrusion disposed along the upper edge with a circular cross-section. The upper protrusion extends generally orthogonal to the key blade centerline. The upper protrusion is longitudinally intermediate the tip and the bow. A slot is disposed adjacent the protrusion and the slot is disposed longitudinally intermediate the protrusion and the bow. The bottom extent of the slot defines a first height relative to the key blade centerline. The first height is positioned closer to the key blade centerline than any other part of the upper edge.

The key further comprising a land abutting the protrusion, the protrusion separating the land and the slot. The land defines a second height relative to the key centerline and the second height is greater than the first height. The upper extent of the protrusion defines a third height and the third height is greater than the second height. Further, the blade comprises irregular surfaces defining bitting, the bitting positioned longitudinally intermediate the protrusion and the tip.

In yet another embodiment of the present disclosure, a key blank is disclosed. A key blank comprising a bow and a blade extending longitudinally form the bow along a key blade centerline to a tip. The blade has a pair of spaced upper and lower edges which are interconnected by opposite side faces, the upper edge having an upper edge width. The blade further comprises a protrusion disposed along the upper edge with a circular cross-section. The protrusion extends generally orthogonal to the key blade centerline and is positioned longitudinally intermediate the tip and the bow. A slot is disposed adjacent the protrusion, and the slot is disposed longitudinally intermediate the protrusion and the bow. The slot is defined by a bottom extent, a front wall extending upward to the protrusion, and a rear wall positioned between the front wall and the bow. The rear wall substantially transverse the key blade centerline and the rear wall has a rear wall width that is less than the upper edge width.

The key blank further comprises an extension extending longitudinally along the upper edge between the bow and the rear wall, and the extension has a tapered profile between the bow and the rear wall. The upper extent of the protrusion is vertically higher than the extension. Further, the bottom extent of the slot is positioned closer to the key blade centerline than any other part of the upper edge. Further the rear wall is nominally planar and the extension is asymmetrical about the blade centerline when viewed from a top view.

In yet another embodiment, a key is disclosed. A key comprising a bow and a blade extending longitudinally from the bow along a key blade centerline to a tip. The blade has a pair of spaced upper edge having an upper edge width. The blade further comprises a protrusion disposed along the upper edge with a circular cross-section, the protrusion extending generally orthogonal to the key blade centerline. The protrusion is positioned longitudinally intermediate the tip and the bow. The blade further comprising a slot disposed between the protrusion and the bow. The slot is defined by a bottom extent, a front wall extending upward from the bottom extent to the protrusion, and a rear wall positioned between the front wall and the bow. The rear wall is substantially planar.

The rear wall of the key is substantially perpendicular to the key blade centerline. The bottom extent of the slot is positioned closer to the key blade centerline than any other part of the upper edge. The key further comprising an extension extending longitudinally along the upper edge between the bow and the rear wall, the extension having a tapered profile between the bow and the rear wall. Further, the upper extent of the protrusion is vertically higher than the extension, and the blade further comprises irregular surfaces defining bitting and the bitting is positioned longitudinally intermediate the protrusion and the tip.

In yet another embodiment of the present disclosure, a lock system is disclosed. A lock system comprising a key comprising a bow, and a blade extending longitudinally from the bow along a key blade centerline to a tip. The blade comprises an upper edge, and the upper edge comprises a bitting. A protrusion extends above the bitting, and the protrusion is positioned intermediate the bitting and the bow. A slot is disposed intermediate the protrusion and the bow, the slot defined by a bottom extent, a front wall extending upward from the bottom extent to the protrusion and a rear wall. The rear wall has a rear wall profile. The lock system further comprises an auxiliary pin comprising a pin body, the pin body comprising a receiving area with a receiving area profile. The lock system further comprising a plug comprising a keyway. The keyway is sized and shaped to receive the blade of the key so that bitting mates with a tumbler stack to unlock the lock system. A chamber in the plug is sized and shaped to receive the auxiliary pin. The rear wall profile and the receiving area profile are substantially congruent, and the rear wall is configured to stabilize the auxiliary pin when the bitting mates with the tumbler stack to unlock the lock system.

The auxiliary pin further comprises an opening and a headed pin is configured to be received within the auxiliary pin opening. The headed pin and auxiliary pin is movable relative to one another. Further, the rear wall acts as a stabilizing surface for the auxiliary pin to maintain substantial coaxiality with the headed pin and the protrusion. Further, the rear wall is substantially planar, and the rear wall is substantially perpendicular to the key blade centerline.

DETAILED DESCRIPTION OF THE DRAWINGS

Figure 1:
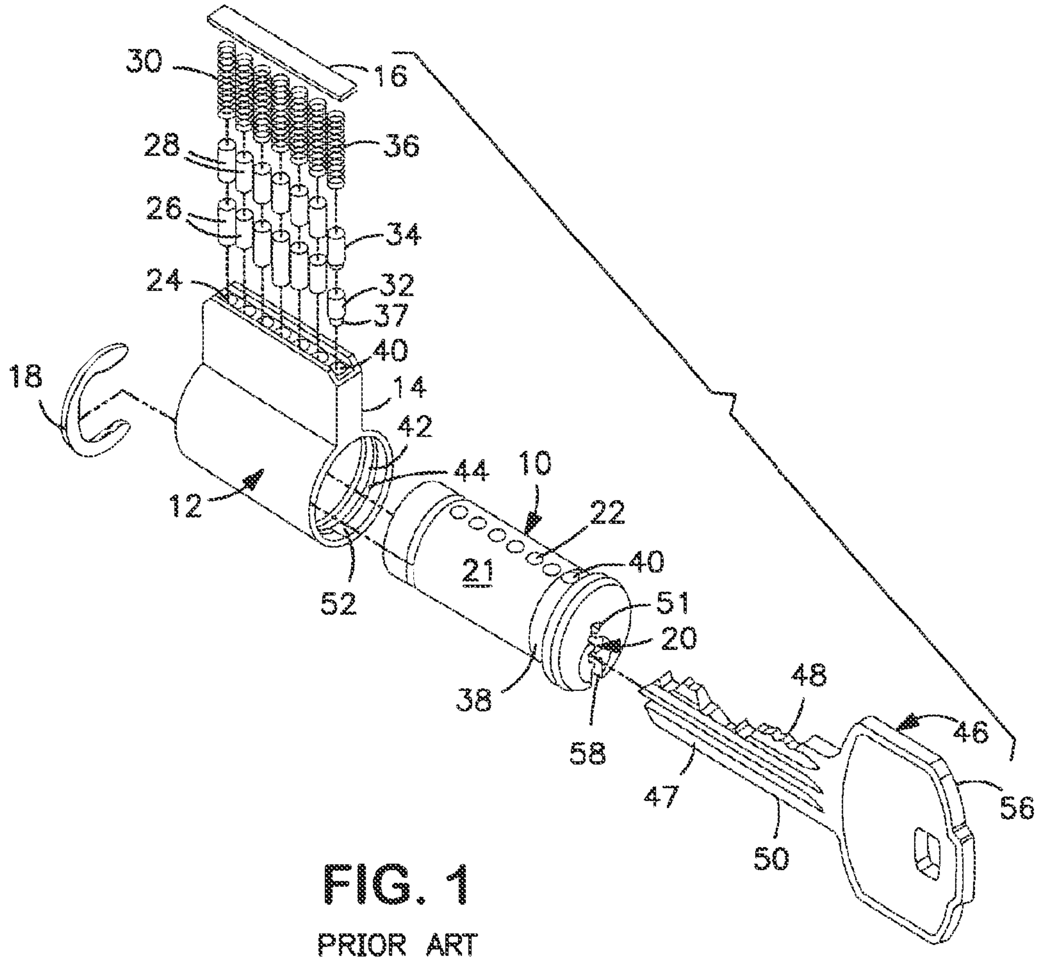
FIG. 1 PRIOR ART
FIG. 1 is a perspective view of a predicate locking system.

The context of this disclosure will be described with references to the prior art, as shown in FIG. 1, and the inventive features of this disclosure will be described with reference to FIGS. 2-20.

As shown in FIG. 1, plug 10 is shown with shell 12. Plug 10 is cylindrically shaped and received within shell 12. Plug 10 is retained within shell 12 by a lock ring 18. Shell 12 comprises projection 14, or a 'bible', extending from the top of shell 12, the projection 14 including a plurality of tumbler chambers 24. These types of locks are known in the art as 'bible' locks. Tumbler chambers 24 receive driver pins 28 and their respective biasing springs 30. Biasing springs 30 are retained on an upper end by plate 16, which closes projection 14.

Plug 10 includes keyway 20 extending through a portion of the length of plug 10. Plug 10 further includes cylindrical intermediate portion 21 which includes a single row of spaced pin chambers 22 in which lower pins 26 are received. Pin chambers 22 extend through a top of plug 10 and into keyway 20. When the plug 10 is received by shell 12, and the lock is in the locked position, pin chambers 22 are aligned with tumbler chambers 24, and lower pins 26 are aligned with driver pins 28 and biasing springs 30. While in the locked position, biasing springs 30 bias driver pins 28 so they extend across the shear line created between plug 10 and shell 12, and rotation of plug 10 relative to shell 12 is prevented. When a proper key is inserted into keyway 20, the position of driver pins 28 is changed so that a bottom of driver pins 28 aligns with the shear line 125, allowing rotation of plug 10 relative to shell 12. Shell 12 includes recess 42 which is complementary in size and shape to enlarged diameter portion 38. Enlarged diameter portion 38 is disposed forwardly of the cylindrical intermediate portion 21, and is received by recess 42.

Shell 12 also includes circumferential groove 44 which is a larger diameter than enlarged diameter portion 38 and is concentrically positioned at a horizontally intermediate position within the recess 42. Shell 12 also includes recess 52 that is positioned along a bottom of shell 12 and extends along shell 12 to a point that intersects with groove 44.

Key 46 further includes bow 56, blade 47 and bitting on an upper edge of blade 47. Key 46 also includes a pair of oppositely disposed projections, wherein an upper projection 48 is disposed between the bitting and the bow 56, and a lower projection 50 is disposed along a lower edge of blade

47, generally opposite upper projection 48. When key 46 is inserted into keyway 20, lower projection 50 is received by recess 52, and when key 46 is fully received within keyway 20, lower projection 50 is received by groove 44, allowing lower projection 50 to rotate within groove 44 with key 46 when the lock is in an unlocked position. When key 46 is inserted and rotated from a first position, or neutral position, lower projection 50 remains within groove 44 and prevents key 46 from being removed until key 46 is rotated back to its first, or neutral position. Keyway 20 includes an upper passage 51 to receive the upper projection 48 and a lower passage 58 to receive the lower projection 50. The lower passage 58 extends through the bottom of plug 10 allowing lower projection 50 to be received within recess 52 and groove 44.

Still referring to FIG. 1, the lock includes an auxiliary pin tumbler stack, which includes auxiliary lower pin 32, an auxiliary driver pin 34, and a biasing spring 36. Plug 10 includes an auxiliary chamber 40 which is positioned within the enlarged diameter portion 38, extending down to meet the keyway 20. Auxiliary chamber 40 retains auxiliary lower pin 32 Projection 14 also includes an auxiliary tumbler chamber 40 to receive the auxiliary driver pin 34 and the biasing spring 36. Bottom face 37 of auxiliary lower pin 32 interfaces with upper projection 48, and when an improper key is inserted into keyway 20, either the auxiliary lower pin 32 or the auxiliary driver pin 34 extends across the shear line and prevents the plug 10 from rotating with respect to the shell 12.

Additional details regarding the predicate locking systems are found in U.S. Pat. No. 7,392,676, issued Jul. 1, 2008 titled KEY BLANK WITH PROJECTION; and U.S. Pat. No. 7,181,941, issued Feb. 27, 2007 titled LOCK SYSTEM WITH IMPROVED AUXILIARY PIN TUMBLER STACK, the entire disclosures of which are hereby expressly incorporated herein by reference for all purposes.

Now referring to FIGS. 2-20, the locking mechanism and the inventive aspects thereof of the present disclosure will be explained. It should be appreciated that the locking mechanism of the present disclosure comprises various similar components as the predicate system described above.

Figure 11:
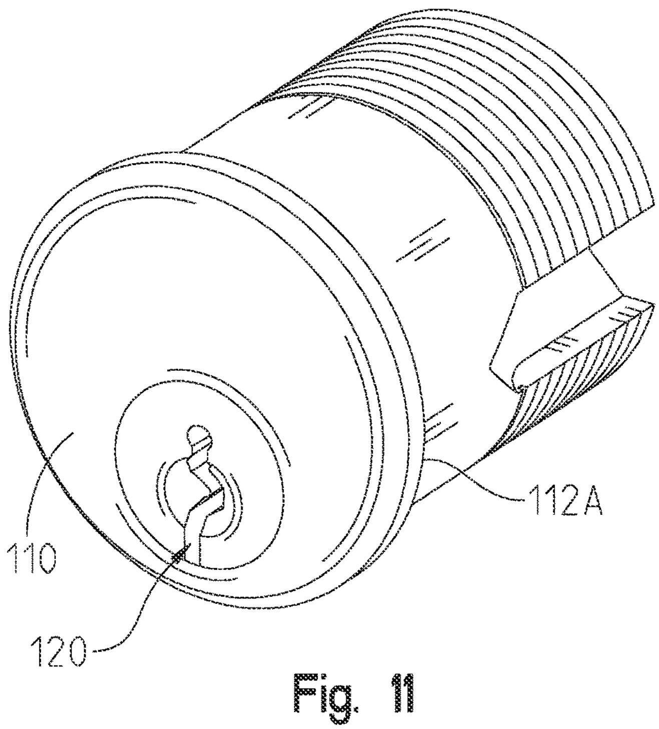
FIG. 11 is a perspective view of an embodiment of the locking system of the present disclosure.
Figure 12:
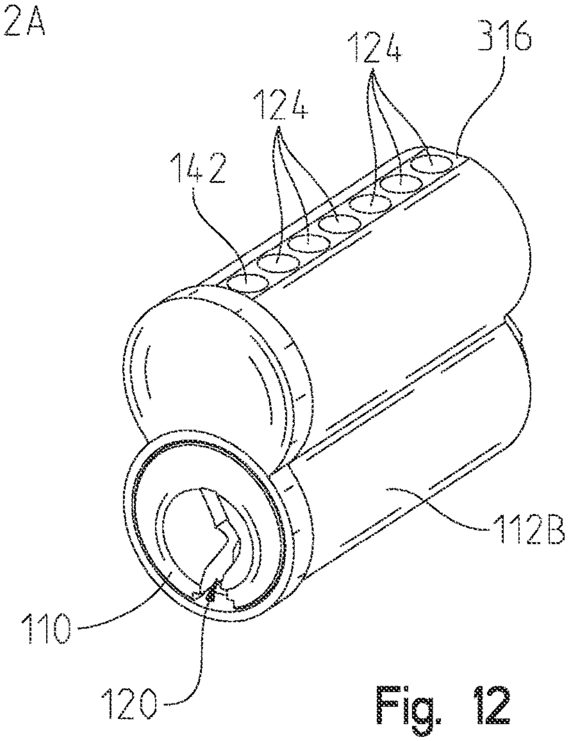
FIG. 12 is a perspective view of an embodiment of the locking system of the present disclosure.
Figure 13:
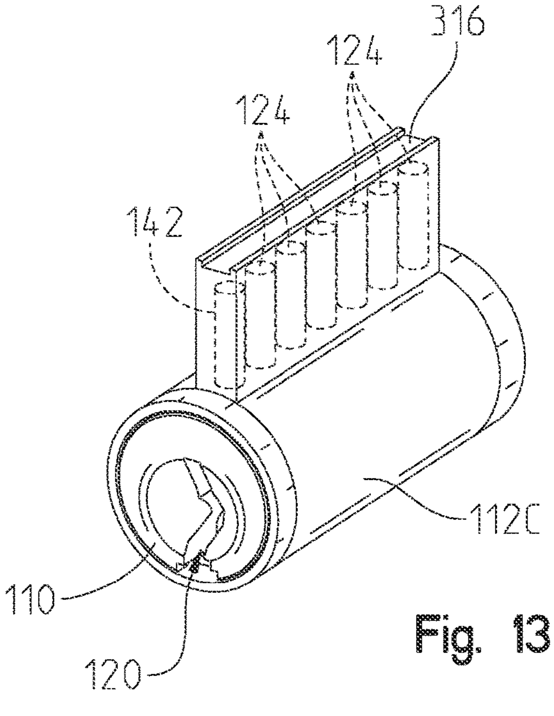
FIG. 13 is a perspective view of an embodiment of the locking system of the present disclosure.

Locking system 100 includes plug 110, configured with a single row of pin chambers 122 aligned along the top of plug 110, the pin chambers 122 positioned within a cylindrical intermediate portion 121. Plug 110 includes keyway 120 extending through the length of plug 110. Locking system 100 also includes lower pins 126, driver pins 128, and biasing springs 130 retained within pin chambers 122 and upper chambers 124 (FIGS. 12-13) within a shell 112 (FIGS. 11-13). Biasing springs 130 are positionally constrained on an upper end, e.g., by plate 316 (FIGS. 12-13), and bias driver pins 128 and lower pins 126 within pin chambers 122 and upper chambers 124 (FIGS. 12-13). Plug 110 also includes an enlarged diameter portion 138 disposed forwardly of the cylindrical intermediate portion 121, wherein an auxiliary pin chamber 140 is positioned through the enlarged diameter portion 138. Auxiliary pin chamber 140 extends from a top of plug 110 into keyway 120. Auxiliary pin chamber 140 receives both auxiliary pin 200 and headed pin 220. Auxiliary pin 200 has a non-circular cross-section when viewed from above that is nominally complementary to the cross-section of auxiliary pin chamber 140 and, therefore, auxiliary pin 200 is keyed to auxiliary pin chamber 140 and may not rotate within it. Auxiliary pin 200 and headed pin 220 are sized and shaped to extend into keyway 120. Further, an auxiliary drive pin 134 is positioned within auxiliary upper chamber 142 (FIGS. 12-13) and biased by an auxiliary biasing spring 136. Auxiliary biasing spring 136 is positionally constrained on an upper end by fixed plate 316.

Figure 2:
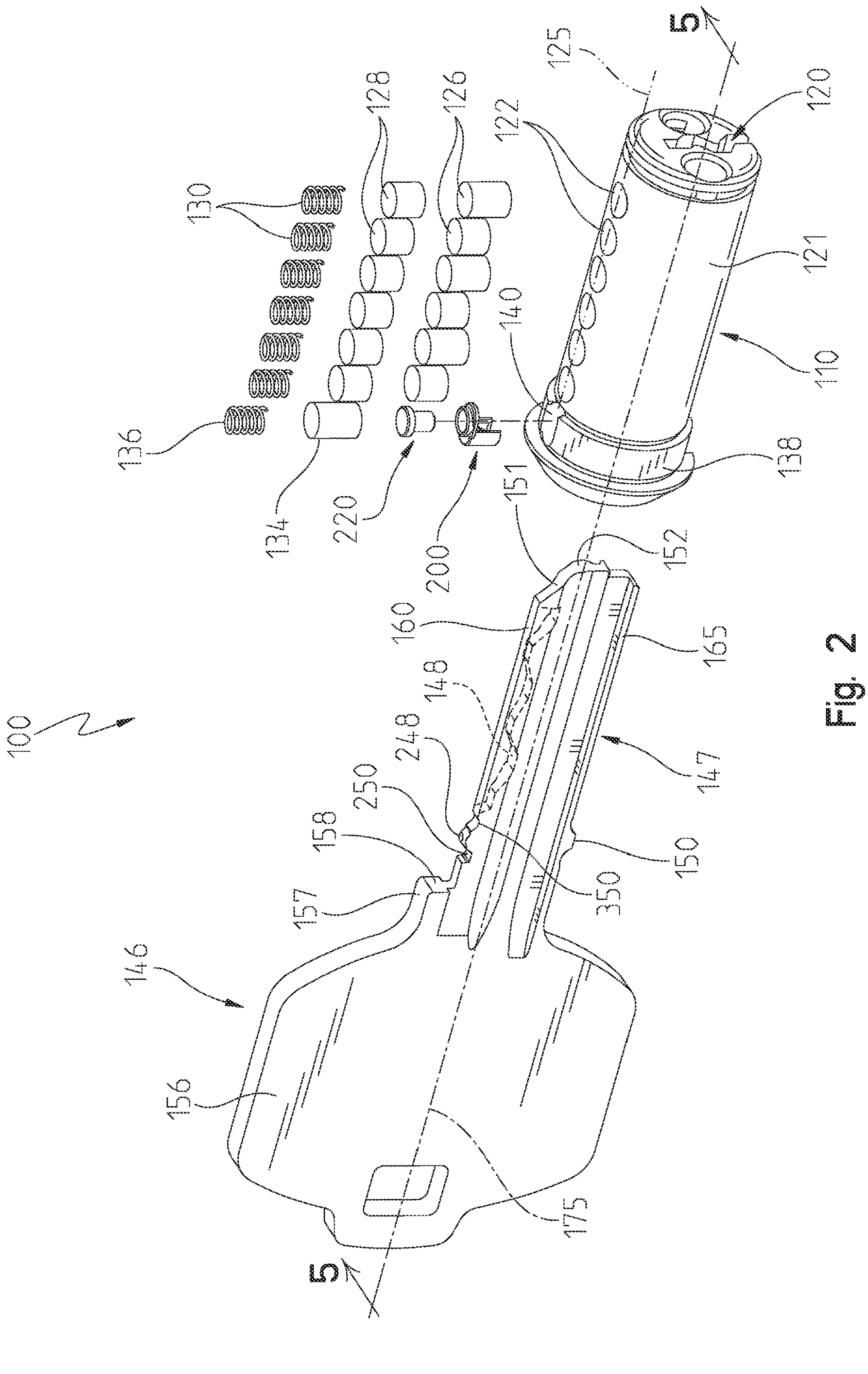
FIG. 2 is an exploded perspective view of the locking system of the present disclosure.

Key 146 includes bow 156 intended to be grasped by a user, and blade 147 to be inserted into keyway 120. Blade 147 extends outward from bow 156 along key centerline 175 to tip 152, wherein angled forward surface 151 extends downward from upper edge 160 to tip 152. Shoulder 157 extends outward from bow 156, providing a stop surface 158 limiting travel of key 146 into plug 110. Blade 147 includes upper edge 160 and lower edge 165, connected by a pair of side faces. Upper edge 160 includes upper projection 248 and slot 250, and the lower edge 165 includes a lower projection 150 disposed nominally opposite the upper projection 248. Blade 147 also includes a plurality of irregular surfaces defining bitting 148. Bitting 148 acts against lower pins 126 in operation. In various embodiments, blade 147 may be void of bitting, and may be a blank key. When a proper key 146 is inserted into keyway 120, each of auxiliary pin 200, headed pin 220, and lower pins 126 are all properly positioned vertically by the bitting, slot 250 and upper projection 248, and plug 110 is able to rotate relative to shell 112. Further, a first shear line 125 between lower pins 126 and driver pins 128 and a second shear line, or auxiliary shear line 139, between headed pin 220 and auxiliary drive pin 134 remains unobstructed and plug 110 can rotate relative to shell 112. In various embodiments, key 146 may include a land section which is void of bitting, protrusion, or other physical feature. For example, blade 147 may include a land section on upper edge 160 before bitting 148 is manufactured into blade 147. In various embodiments, blade 147 includes a land section positioned between upper projection 248 and bitting 148 after manufacturing of key 146. Blade 147 also includes a slot 350. Illustratively, slot 350 is positioned longitudinally intermediate upper projection 248 and tip 152 along the longitudinal direction as shown in FIG. 2.

Shell 112 includes certain similar characteristics as the predicate art. For example, shell 112 includes a recess (not shown, similar to recess 42) shaped appropriately to receive the enlarged diameter portion 138 of plug 110. Shell 112 may also include a recess (not shown, similar to recess 52) extending along keyway 20, and as key 146 is inserted into keyway 20, lower projection 150 is allowed to pass through the recess. The interface between the pin chambers 122 and upper chambers 124 creates a first shear line 125, and the interface between the enlarged diameter portion 138 and the portion of shell 12 above recess 42 creates a second shear line, or auxiliary shear line 139.

Figure 3:
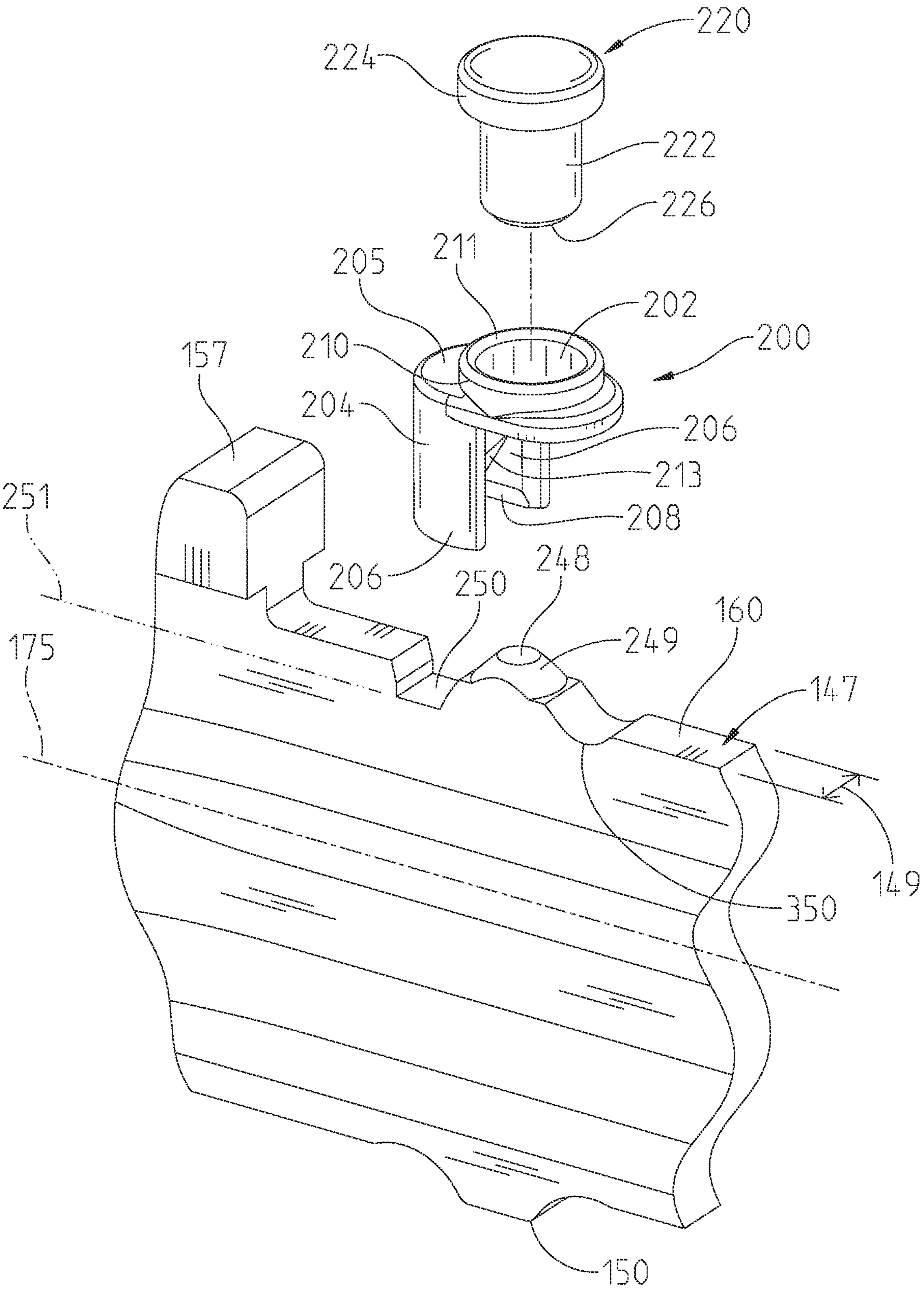
FIG. 3 is an exploded perspective view of an auxiliary tumbler system of FIG. 2.
Figure 4:
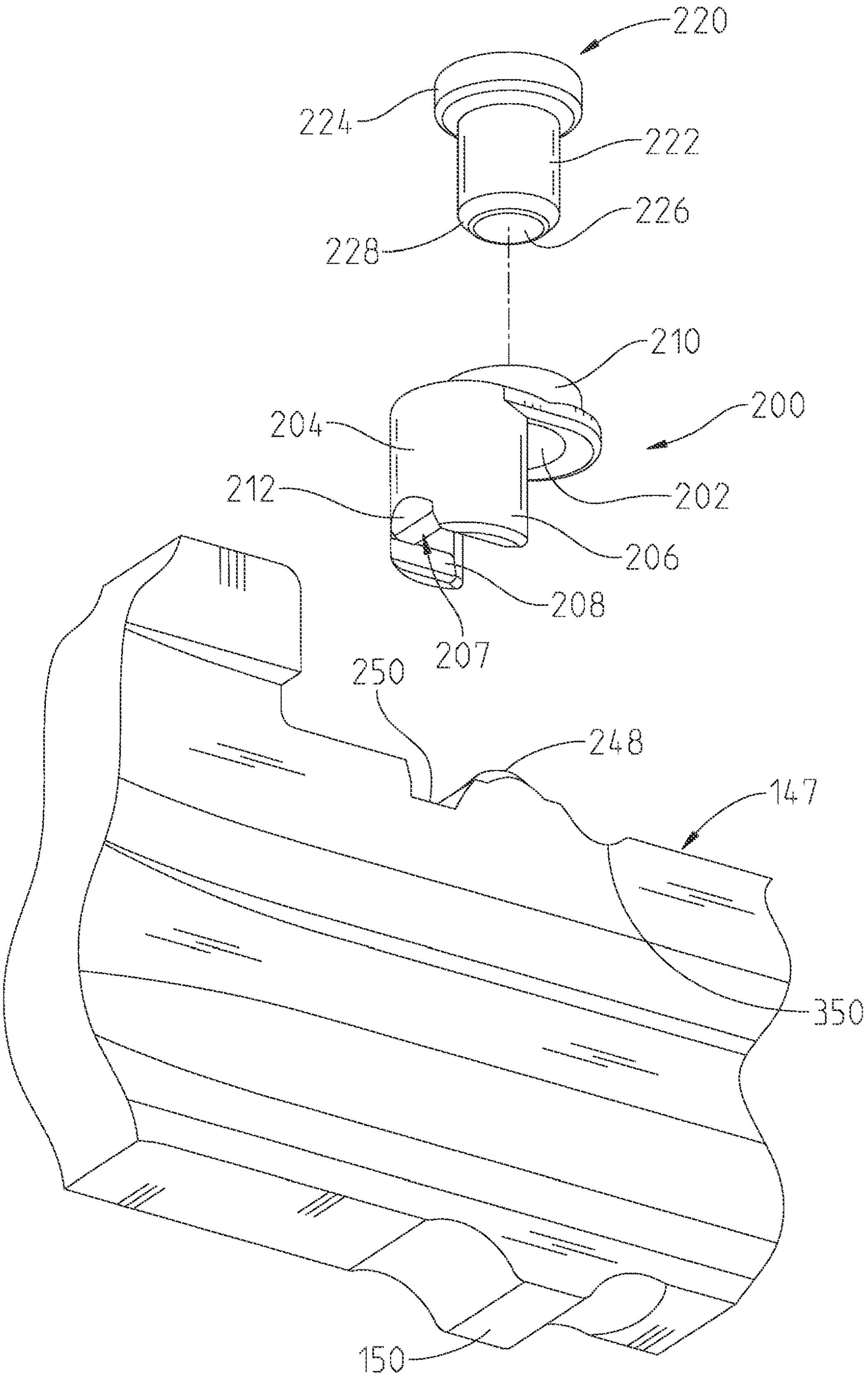
FIG. 4 is an exploded perspective view of an auxiliary tumbler system of FIG. 2.

Referring now particularly to FIGS. 3-4, projection 248 includes a ramped, or tapered surface 249, or compound convex surface, extending from the peak of projection 248 downward to upper edge 160 of blade 147, wherein upper edge 160 has upper edge width 149. Illustratively, ramped surface 249 is conical and comprises a constantly angled surface around the entirety of projection 248. In various embodiments, ramped surface 249 may be pyramidal, or shaped otherwise to provide an angled surface between the peak of projection 248 and the upper edge 160 of blade 147. Slot 250 is positioned between projection 248 and shoulder 157, and more directly, slot 250 is positioned proximate projection 248. In the document, the arrangement of "proximate" or "adjacent" when referring to the spacing of features of key 146 signals a spacing of 1-2 millimeters. Slot 250 extends downward from upper edge 160 toward key centerline 175 and has a slot lower extent 251. In various embodiments, slot lower extent 251 may be varied during the manufacturing process. In various embodiments, slot 250 is a normalized shape and size, and is constantly shaped across various keys 146.

Figure 10:
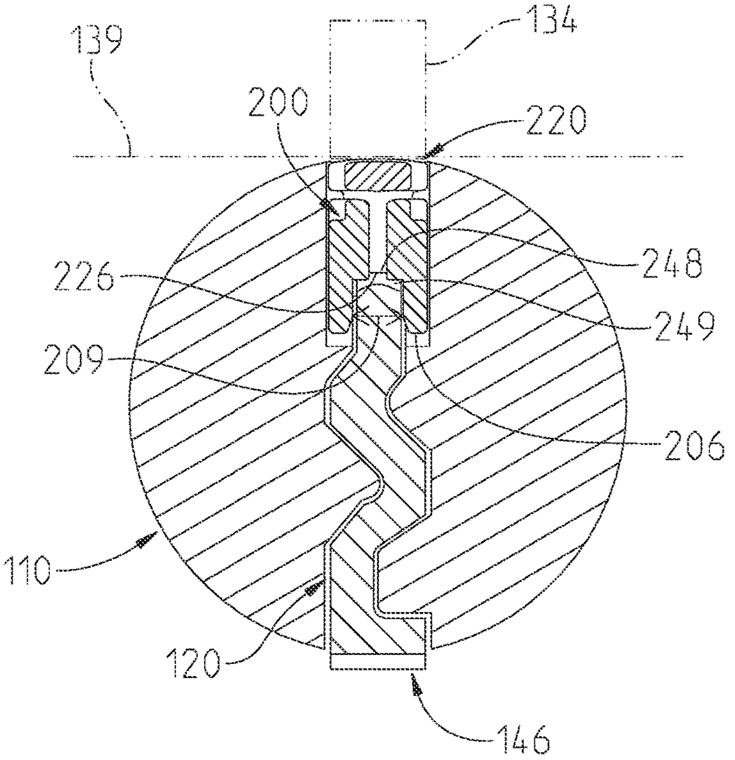
FIG. 10 is a cross section view of a completely inserted key and a locking system of FIG. 2, taken along line 10-10 of FIG. 9.

Locking system 100 includes auxiliary pin 200. Auxiliary pin 200 includes a body 204 which is generally an extruded C-shape, wherein pin extensions 206 are located at a lower end of body 204. Cover 205 extends transverse to the extruded body 204 at its upper extent and is generally rounded. Cover 205 includes an opening, or receiving area 202, wherein collar 210 extends upward from cover 205 and surrounds opening 202. Collar 210 includes chamfered surface 211 to provide compliance when inserting headed pin 220. Auxiliary pin 200 also includes chamfer 208 at a lower extent, and an inner side of, both extensions 206. In the present embodiment, chamfer 208 is at an angle of 20 degrees from a vertical plane. In various embodiments, chamfer 208 may be angled 10 degrees to 45 degrees from a vertical plane. Extensions 206 each extend down past a lower extent of body 204, to define a bridge 207 between the extensions 206, wherein the bridge 207 has a bridge width 209 (FIG. 10). When a proper key is inserted into keyway 120, bridge 207 is received by slot 250. Bridge 207 further includes an outward facing chamfer 212 (FIG. 4), and an inward facing chamfer 213 (FIG. 3). In the present embodiment, outward facing chamfer 212 is at an angle of 35 degrees from a vertical plane. In various embodiments, chamfer 212 may be angled 10 degrees to 60 degrees from a vertical plane. In the present embodiment, inward facing chamfer 213 is at an angle of 30 degrees from a vertical plane. In various embodiments, chamfer 213 may be angled 10 degrees to 60 degrees from a vertical plane.

Headed pin 220 includes body 222 commensurately sized to fit within opening 202. That is, body 222 has a diameter nominally substantially equal to, i.e., slightly less than, the diameter of opening 202. Body 222 includes a bottom surface 226 configured for engagement with projection 248, wherein a chamfer 228 extends between body 222 and bottom surface 226. Headed pin 220 also includes a head 224, or flange, which cooperates with the collar 210 when body 222 of headed pin 220 is inserted into opening 202 of auxiliary pin 200. Head 224 provides a stop for headed pin 220 and prevents further downward movement of headed pin 220 relative to auxiliary pin 200.

Figure 5:
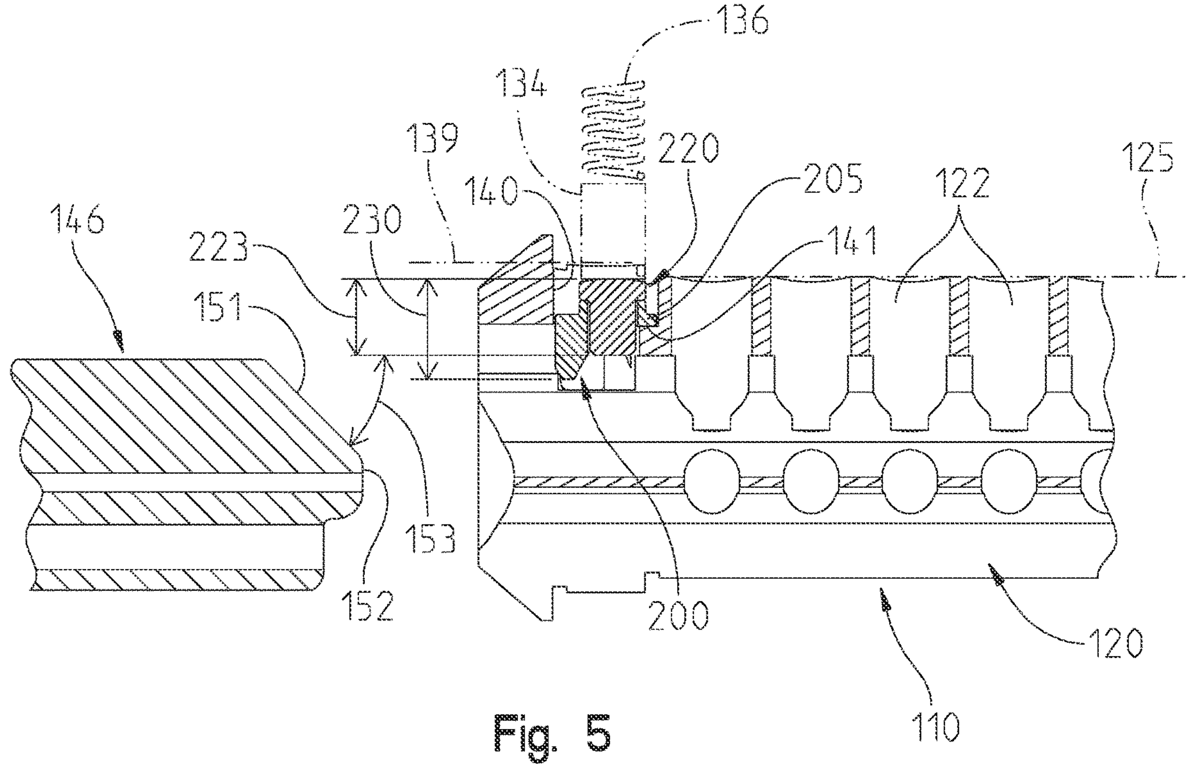
FIG. 5 is a cross-section view of a key and a locking system of FIG. 2.

Now referring to FIGS. 5-9, the process of inserting key 146 into plug 110 will be explained. In FIG. 5, key 146 is vertically and horizontally aligned with keyway 120. Key 146 includes tip 152, positioned at the longitudinal end of angled forward surface 151. In the present embodiment, angled forward surface 151 is angled downward at an angle 153. Auxiliary pin chamber 140 in plug 110 includes shoulder 141 positioned within chamber 140 and nominally parallel to key centerline 175. In the exemplification shown, key centerline 175 is the centerline of bow 156 and blade 147. Should bow 156 be asymmetric relative to blade 147, centerline 175 will be the centerline of key blade 147. Shoulder 141 receives cover 205 of auxiliary pin 200 and prevents auxiliary pin 200 from moving further downward and prevents auxiliary pin 200 from falling through keyway 120 when key 146 is not in keyway 120. Illustratively, headed pin 220 is received within opening 202, and collar 210 receives head 224 thereon. In the configuration of FIG. 5, auxiliary pin 200 and headed pin 220 are in a compacted configuration with their smallest assembled height. That is, body 222 of headed pin 220 is received within opening 202, and head 224 of headed pin is in contact with collar 210 of auxiliary pin 200. Headed pin 220 has a headed pin height 223, and when auxiliary pin 200 and headed pin are in their smallest assembled height, the vertical distance between bridge 207 of auxiliary pin 200 and the upper extent of head 224 is auxiliary height 230. Further, drive pin 134 and associated auxiliary biasing spring 136 biases headed pin 220 downward, and auxiliary pin 200 is biased downward by headed pin 220 or gravity. When an improper key 146 is inserted into keyway 120, drive pin 134 or headed pin 122 extends across the second shear line 139, preventing rotation of plug 110 relative to shell 112. In this configuration, locking system 100 is in a locked position.

Figure 6:
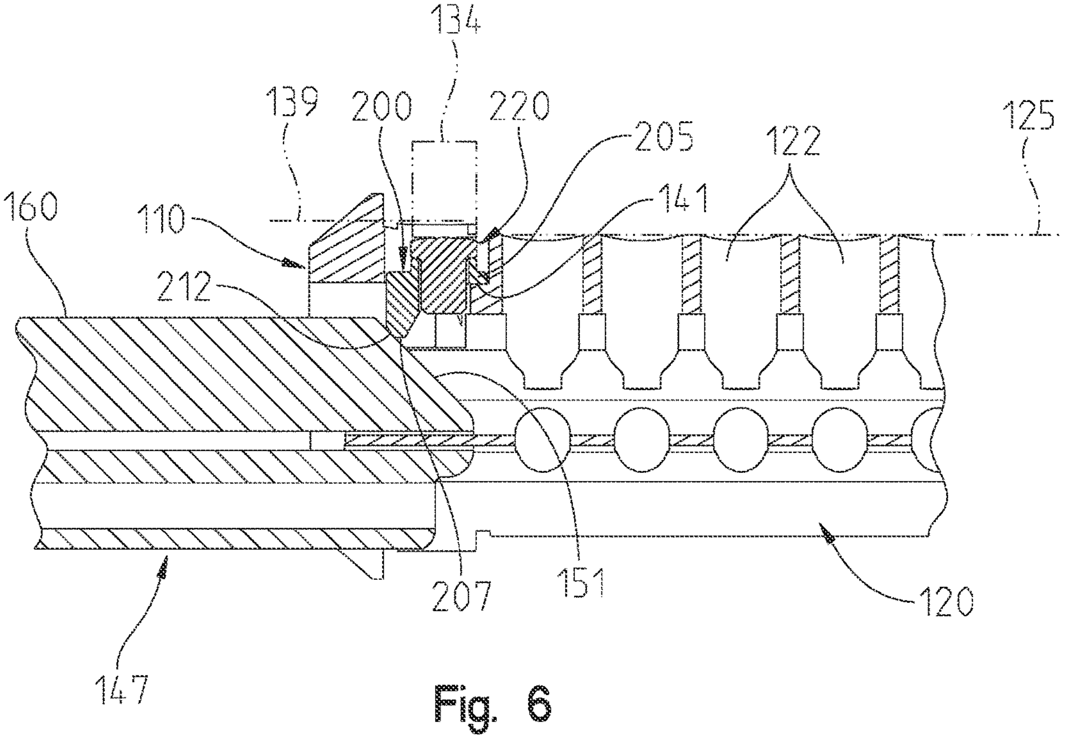
FIG. 6 is a cross-section view of a partially inserted key and a locking system of FIG. 2, taken along line 5-5 of FIG. 2.

Referring now to FIG. 6, key 146 is partially inserted into keyway 120. Illustratively, key 146 initially contacts auxiliary pin 200 at chamfer 212. In the present embodiment, chamfer 212 is constructed with a greater angle than angled forward surface 151, so that chamfer 212 moves easily along angled forward surface 151 as key 146 is moved forward or backward through keyway 120.

Figure 7:
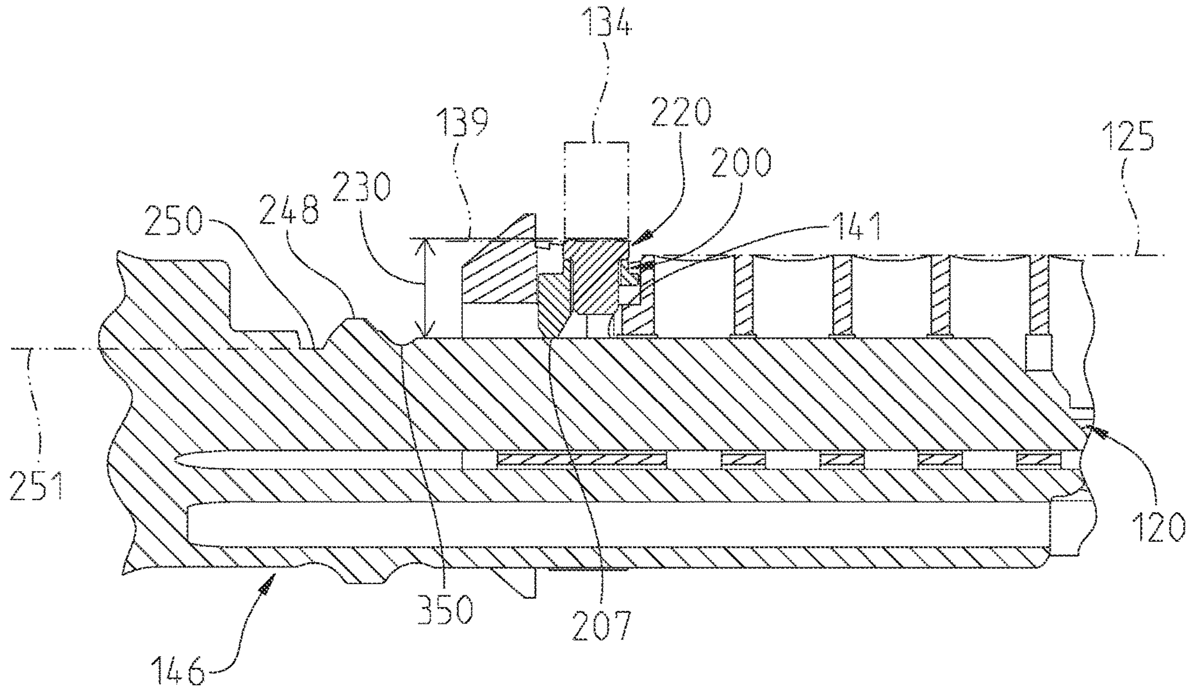
FIG. 7 is a cross-section view of a partially inserted key and a locking system of FIG. 2, taken along line 5-5 of FIG. 2.

Now referring to FIG. 7, key 146 is inserted further into keyway 120, and bridge 207 of auxiliary pin 200 is in contact with upper edge 160 of key 146. In the present embodiment, bridge 207 is in contact with upper edge 160 and has a bridge width 209 that is greater than upper edge width 149, allowing upper edge 160 to pass through extensions 206 of auxiliary pin 200. Extensions 206 extend downward around upper edge 160. In the present embodiment, auxiliary pin 200 rests upon upper edge 160 in this position. Auxiliary pin 200 is pushed upward and is no longer in contact with shoulder 141, and, as auxiliary pin 200 is pushed upward, headed pin 220 is also pushed upward. In the configuration of FIG. 7, auxiliary height 230 is greater than the distance between upper edge 160 of key 146 and auxiliary shear line 139, and headed pin 220 extends across the shear line 139 preventing plug 110 from rotating relative to shell 112.

Figure 8:
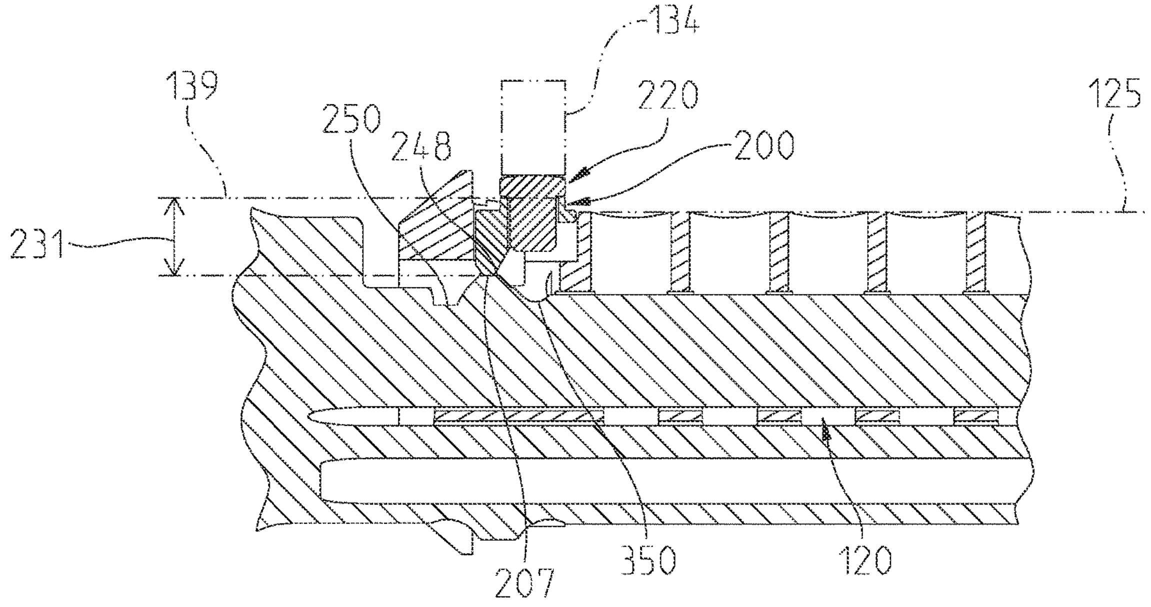
FIG. 8 is a cross-section view of a partially inserted key and a locking system of FIG. 2, taken along line 5-5 of FIG. 2.

Now referring to FIG. 8, bridge 207 is in contact with upper projection 248, and headed pin 220 is positioned above shear line 139, preventing plug 110 from rotating relative to shell 112. Illustratively, the distance between upper projection 248 and shear line 139, with key blade 147 occupying keyway 120, is shear height 231, and as such, upper projection 248 may be adjusted during manufacturing of key 146 to alter the shear height 231. As key 146 is pushed through keyway 120, auxiliary pin 200 will contact ramped surface 249 (FIG. 3) at chamfer 212 (FIG. 4), pushing auxiliary pin 200 upwards as key 146 is pushed further into keyway 120. When key 146 is pushed further into keyway 120, auxiliary pin 200 will progress down an opposing side of ramped surface 249 and be received within slot 250 (FIG. 9).

Figure 9:
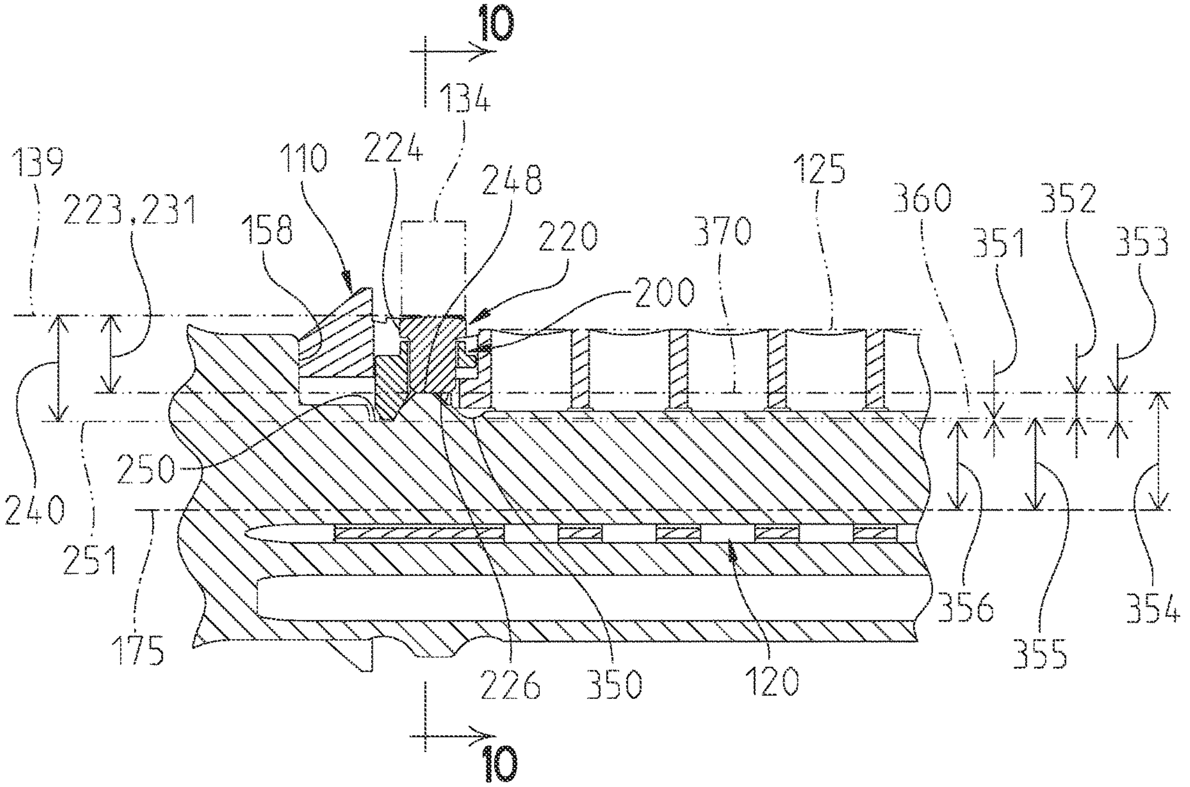
FIG. 9 is a cross-section view of a completely inserted key and a locking system of FIG. 2, taken along line 5-5 of FIG. 2.

In the present embodiment, when key 146 is inserted completely into keyway 120, as shown in FIG. 9, key 146 is positioned properly to unlock locking system 100. Stop surface 158 contacts plug 110 and prevents key 146 from being inserted further into keyway 120. This indicates to a user that key 146 is properly inserted into plug 110. When key 146 is completely inserted into keyway 120, body 204 of auxiliary pin 200 is positioned such that bridge 207 is in contact with the bottom of slot 250. In the present configuration, auxiliary pin 200 is constructed such that when bridge 207 is in contact with the bottom of slot 250, opening 202 is at least partially aligned with projection 248 and bottom surface 226 of headed pin 220 contacts projection 248. When a proper key 146 is completely inserted into keyway 120 projection 248 is manufactured so that shear height 231 is nominally equal to headed pin height 223, and the interface between auxiliary drive pin 134 and headed pin 220 is nominally aligned with the shear line 139, allowing rotation of plug 110 with respect to shell 112. If key 146 is removed from plug 110, inward facing chamfer 213 (FIG. 3) moves over ramped surface 249, allowing auxiliary pin 200 to move over projection 248. If a proper key 146 is properly inserted into keyway 120, plug 110, key 146, auxiliary pin 200 and headed pin 220 are all able to rotate with respect to shell 112. When key 146 is rotated, bridge 207 remains in contact with the bottom of slot 250, and headed pin will contact, or rotate adjacent, i.e. be offset from, the inner wall of shell 112 at the recess (similar to recess 42). Key 146 is prohibited from being removed from keyway 120 when plug 110 is rotated within shell 112 because auxiliary pin 200 is unable to move upward prohibiting inward facing chamfer 213 from moving over ramped surface 249. Key 146 is thus prohibited from being removed from keyway 120.

Locking system 100 further includes a slot depth 240 defined as the distance between the slot lower extent 251 and the shear line 139. In the present embodiment, slot depth 240 must be nominally equal to, or greater than auxiliary height 230. If slot depth 240 is nominally equal to auxiliary height 230, head 224 of headed pin 220 will rest upon the collar 210 of auxiliary pin 200 when a proper key 146 is installed in keyway 120. If slot depth 240 is greater than auxiliary height 230, a gap must be created between collar 210 and head 224 of headed pin 220 when a proper key 146 is installed in keyway 120. Still referring to FIG. 9, the bottom extent of slot 350 is positioned at a height 360 vertically above slot lower extent 251 of slot 250. Further, height 360 is positioned vertically below upper edge 160. Further, the upper extent of upper projection 248 is positioned at a height 370 vertically above height 360. Illustratively, the bottom extent of slot 350 is separated from slot lower extent 251 of slot 250 by a distance 351, the bottom extent of slot 350 is separated from the upper extent of upper projection 248 by a distance 352, and the upper extent of upper projection 248 is separated from slot lower extent 251 of slot 250 by a distance 353. Illustratively, slot lower extent 251 of slot 250 is separated from centerline 175 by a distance 356, the bottom extent of slot 350 is separated from centerline 175 by a distance 355, and the upper extent of upper projection 248 is separated from centerline 175 by a distance 354. In the present embodiment, distance 354 is greater than distance 355 which is greater than distance 356.

Now referring to FIG. 10, a cross section of a key 146 completely inserted into keyway 120 is shown. Bridge 207 (not shown) of auxiliary pin 200 is positioned behind projection 248 and auxiliary pin 200 is allowed to fall into slot 250, and headed pin 220 contacts upper projection 248. Illustratively, when bridge 207 is properly placed in slot 250, extensions 206 extend on either side of blade 147. Bridge width 209 is adequately sized to allow upper edge 160 of blade 147 to pass through. That is, bridge width 209 is slightly larger than upper edge width 149, so that upper edge 160 can pass through extensions 206 of auxiliary pin 200. Additionally, a proper key 146 creates a shear height 231 when installed which is nominally equal to the height of headed pin 220. When the proper key 146 is installed in plug 110, the interface between auxiliary drive pin 134 and headed pin 220 is positioned at the auxiliary shear line 139, allowing plug 110 to rotate relative to shell 112.

In various embodiments, locking system 100 may include various configurations of shell 112. Illustratively, as shown in FIGS. 11-13, shells 112 each include upper chambers 124 configured to retain driver pins 128, biasing springs 130, auxiliary drive pin 134 and auxiliary biasing spring 136. Plug 110 may be inserted into and work with, in the spirit of the present disclosure, a Mortise type shell 112A, a Small Format Interchangeable Core (SFIC) type shell 112B, or a Key In Knob (KIK) type shell 112C. SFIC locks such as the one shown in FIG. 12 includes, as illustrated, a lock core body having an exterior lock core body envelope, the lock core body including an upper lock core body having a first cylindrical portion with a first maximum lateral extent, a lower lock core body having a second cylindrical portion with a second maximum lateral extent, and a waist having a third maximum lateral extent, the third maximum lateral extent being less than the first maximum lateral extent and being less than the second maximum lateral extent. The lock shown in FIG. 13 is sometimes also referred to as a "bible" lock, with the single row of pin tumbler stacks and their associated biasing springs received in chambers provided in the generally rectangular projection with extends upwardly from shell 112C in FIG. 13. The lock cores illustrated in FIGS. 11-13 are useable with a lock device having a locked state preventing movement of a barrier such as a door and an unlocked state allowing movement of the barrier. The lock cores illustrated in FIGS. 11-13 are interchangeable in the lock device and; therefore, are removeable therefrom, e.g., with a tool. While the present embodiment has been identified to work with a variety of shells 112A-C, the figures and descriptions herein should not be limiting as to the scope or application of the present disclosure.

An advantage of the present configuration is that key 146 of the current locking system 100 is backwards compatible with predicate locking systems (e.g. FIG. 1). In one use case, key 146 of the current locking system (i.e. key 146 with slot 250 and projection 248) works with the current configuration of plug 110 (i.e. plug 110 with auxiliary pin 200 and headed pin 220). In another use case, key 146 with slot 250 and projection 248 works with plug 10 of the predicate art that comprises an appropriately sized headed pin 220, or alternatively, auxiliary lower pin 32, but does not include auxiliary pin 200. That is to say that key 146 may access various types of plugs 10, 110. Conversely, key 46 of the predicate art may not provide access, or locking and unlocking ability, to locking system 100. Key 46 does not possess slot 250, and thus, as key 46 is inserted into keyway 120, auxiliary pin 200 would remain positioned too high (e.g. FIG. 7), and push headed pin 220 above shear line 139, preventing plug 110 from rotating with respect to shell 112.

Manufacturing

Key 146 and auxiliary pin 200 may be manufactured using various methods. Before being manufactured to unlock locking system 100, key 146 may include no form of bitting 148, no projection 248, or slot 250. During the blanking process, key will be manufactured to include slot 250, projection 248, and the appropriate upper edge width 149, allowing key 146 to interface with auxiliary pin 200 and headed pin 220 of locking system 100. Key 146 may first have slot 250 cut, stamped, or otherwise manufactured into blade 147. In various embodiments, this method of manufacture may include a tool such as a laser, a saw, a stamping machine, a sander, or other manufacturing tool configured to remove material.

The manufacturing process for key 146 also includes milling the projection 248, and convex compound surface 249, out of the upper edge 160 of blade 147. To create projection 248, a mill is positioned along a trajectory nominally perpendicular to the longitudinal axis of key 146. The rotating mill creates a conical projection 248. Projection 248 and convex compound surface 249 may be milled using a milling tool (not shown). After projection 248 and convex compound surface 249 is milled into upper edge 160 of blade 147, the upper extent of projection 248 may be at a higher elevation than upper extent of upper edge 160 (before bitting is coded onto the blade). After the key is coded with the bitting, e.g., a saw tooth bitting pattern (FIG. 2), the top of the projection 248 will be the highest point on the upper edge 160 out to the tip 152 of the blade 147.

The manufacturing process for key 146 also includes keying the upper edge width 149 to the bridge width 209 of auxiliary pin 200 (i.e. the upper edge 160 is substantially similar in shape to bridge 207, and upper edge width 149 is undersized relative to bridge width 209 such that upper edge 160 of blade 147 may pass through bridge 207). Upper edge width 149 will be machined to be less than the bridge width 209. Upper edge width 149 may be machined to be less than a bridge width of a plurality of locks, making key 146 useable with a subset of locks.

In the present embodiment, auxiliary pin 200 is constructed using a metal injection molding process. Alternatively, auxiliary pin 200 may be created using a different machining process, or a plurality of machining processes. Bridge 207 may be created through the injection molding process, or may, alternatively, be created by cutting material out of body 204, creating bridge 207 and extensions 206.

In various embodiments, various surfaces within locking system 100 may be treated with a surface treatment. Specifically, chamfers 208, 212, and ramped surface 249 may be treated with a chemical, a coating, or may be constructed with a surface finishing process such as polishing in order to decrease friction between moving parts.

Access to Subset of Cylinders

Figure 14:
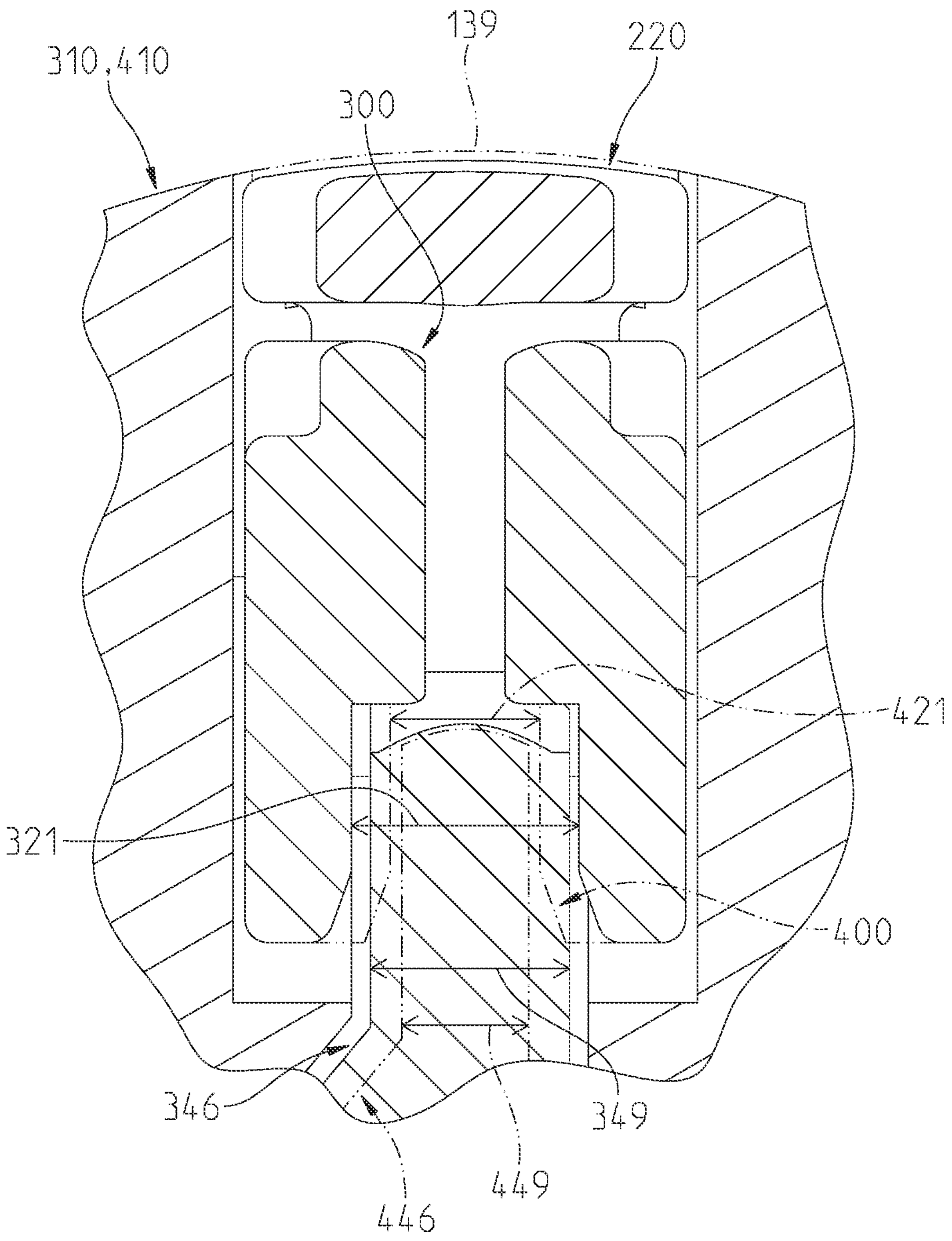
FIG. 14 is a cross section view of a plurality of locking systems of the present disclosure, taken along line 10-10 of FIG. 9.
Figure 15:
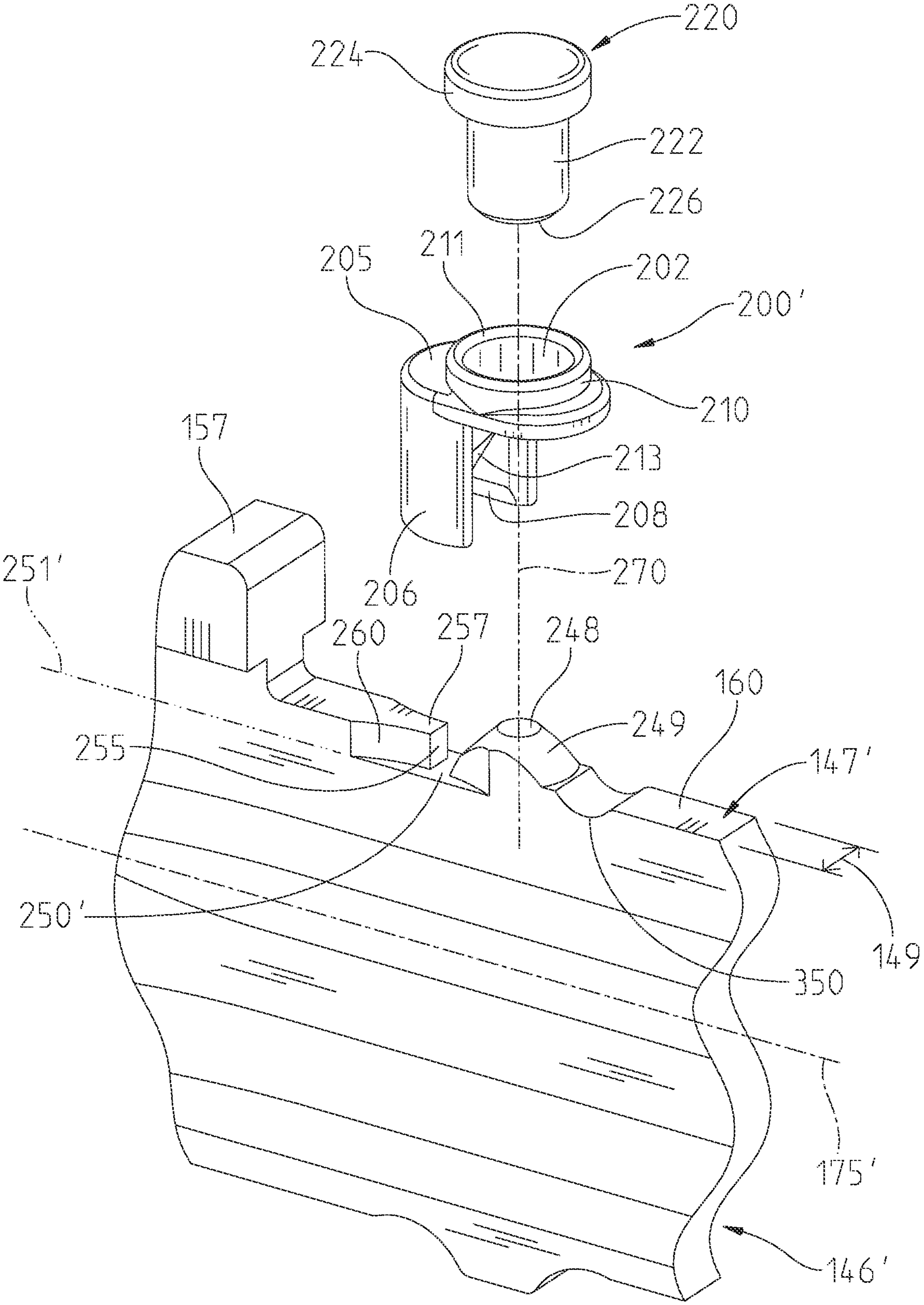
FIG. 15 is an exploded perspective view of an auxiliary tumbler system of the present disclosure.
Figure 16:
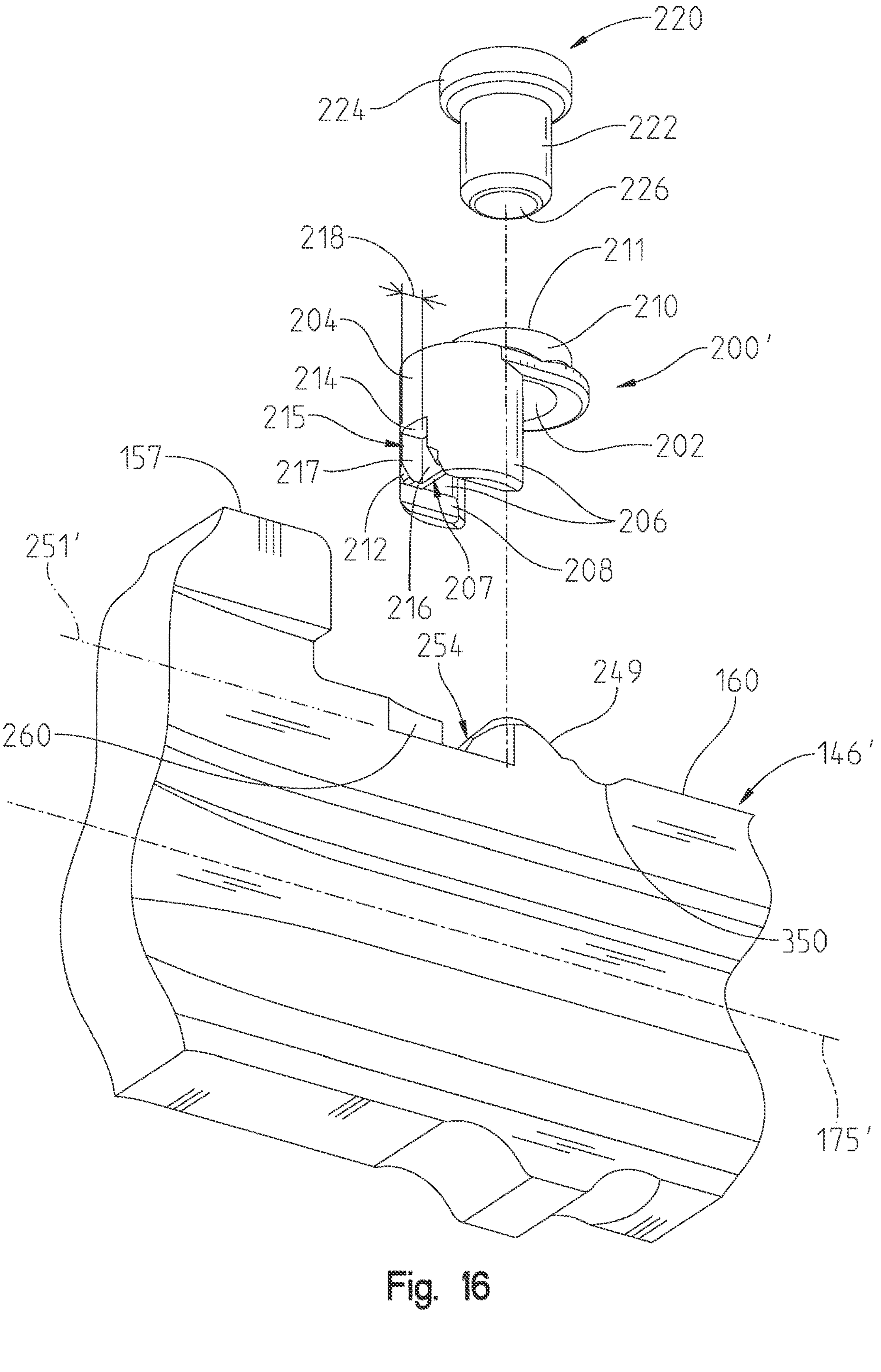
FIG. 16 is an exploded perspective view of the auxiliary tumbler system of FIG. 15.
Figure 17:
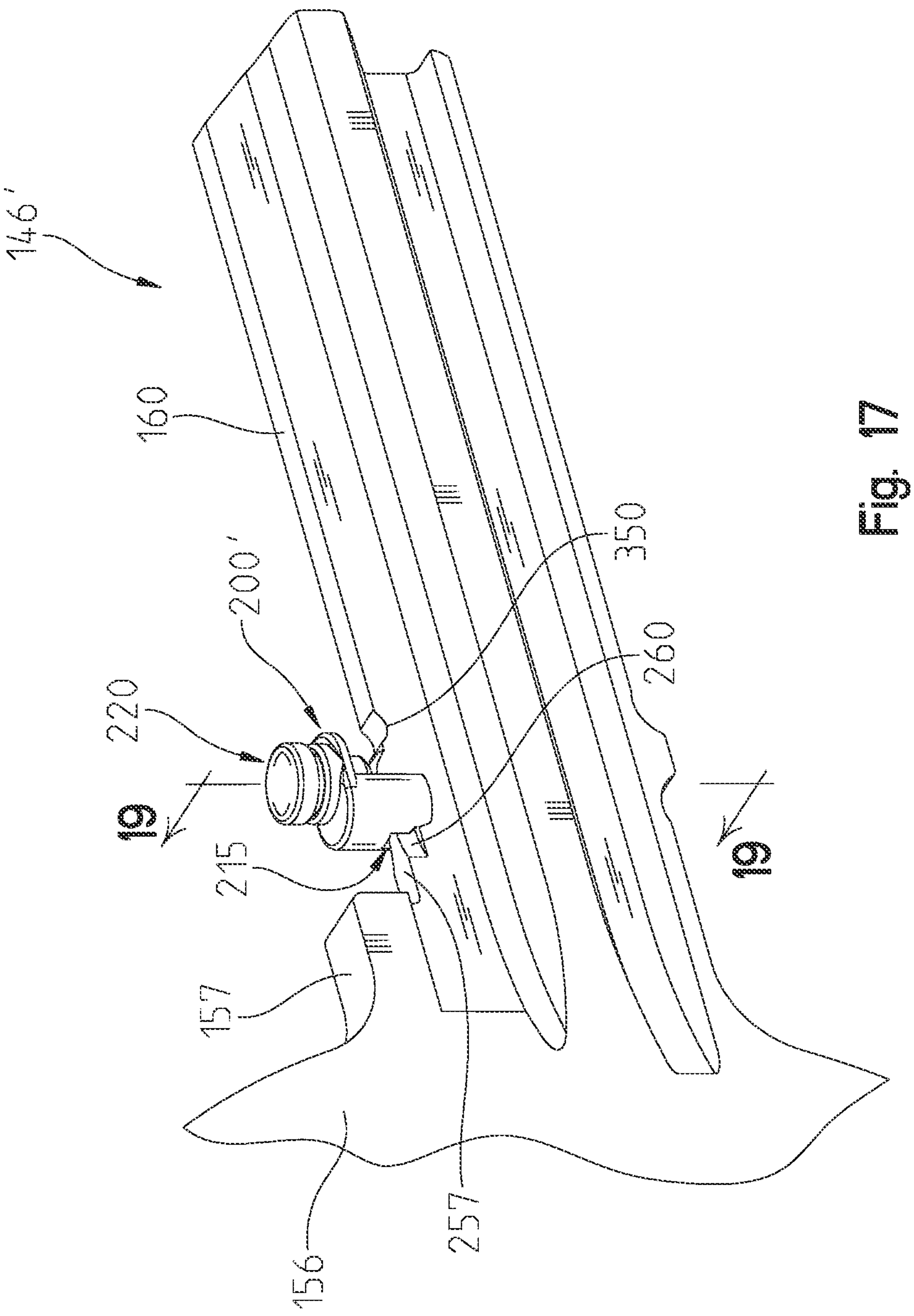
FIG. 17 is a perspective view of the auxiliary tumbler system of FIG. 15.
Figure 18:
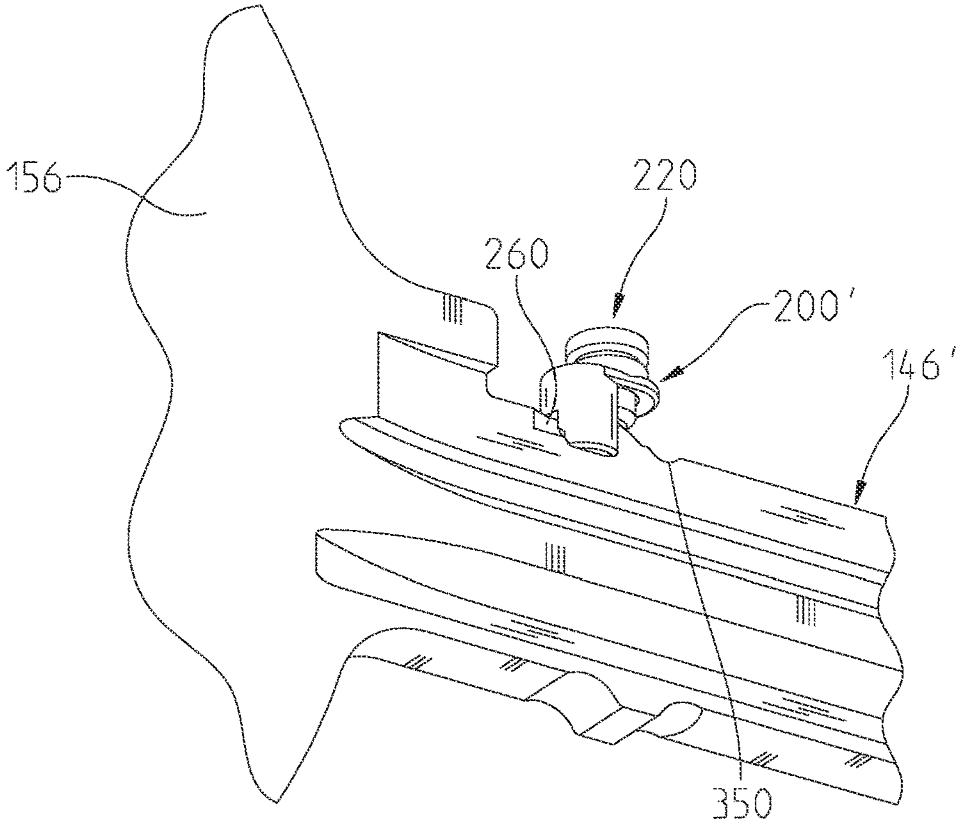
FIG. 18 is a perspective view of the auxiliary tumbler system of FIG. 15.
Figure 19:
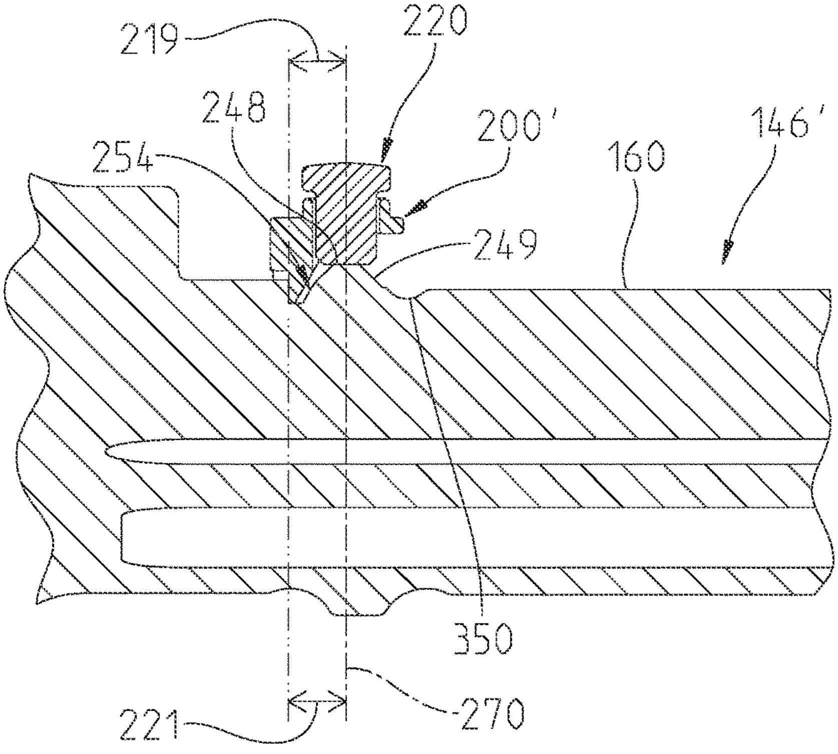
FIG. 19 is a cross section view of the auxiliary tumbler system of FIG. 15, taken along line 19-19 of FIG. 17.
Figure 20:
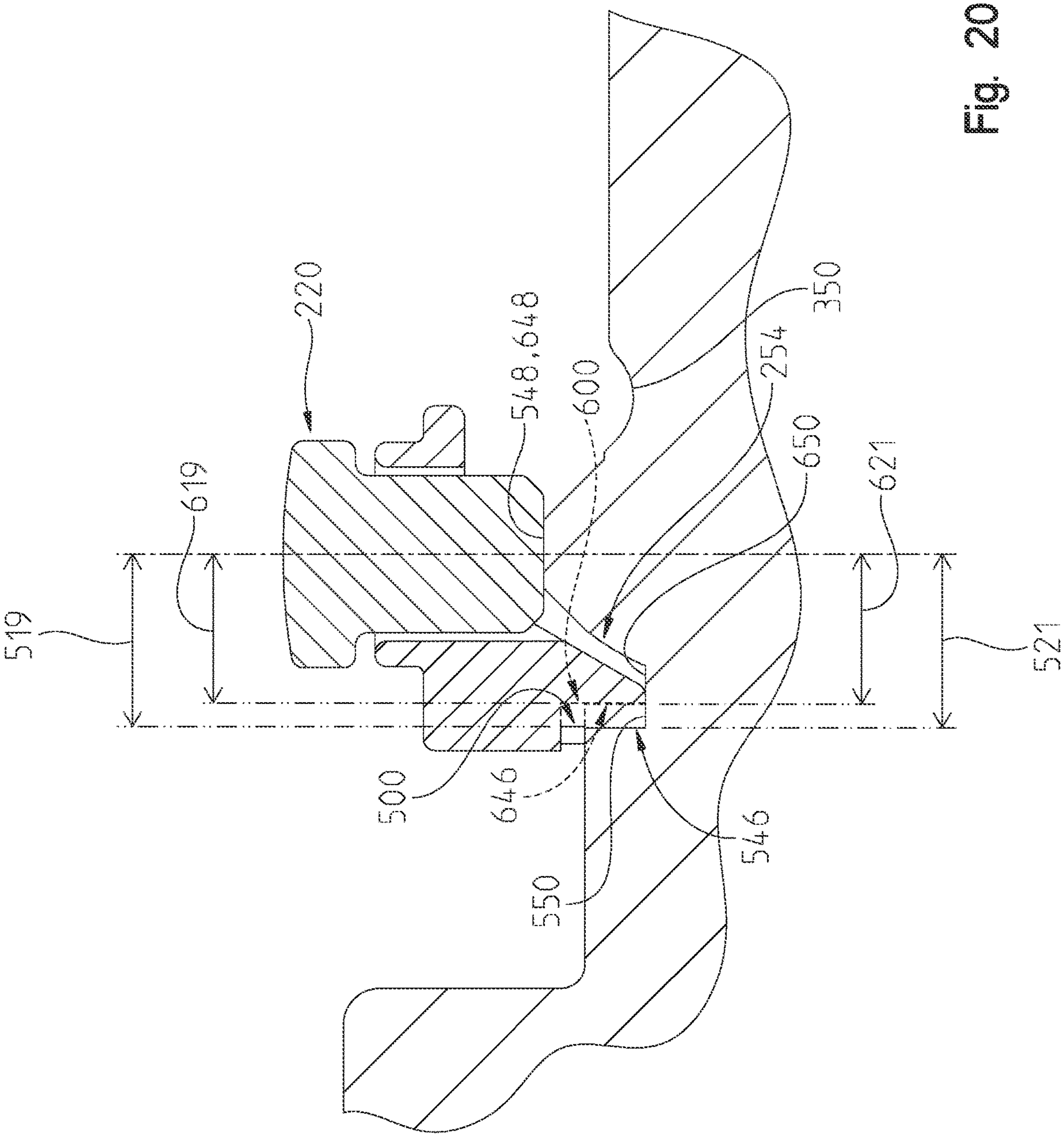
FIG. 20 is a cross-section view of a group of locking systems, taken along line 19-19 of FIG. 17.

Referring now to FIG. 14, a single key may operate a plurality of locking systems to create varying levels of access by varying the upper edge width 149. In one example, first group of locking systems includes a first locking system which includes first plug 310 with a first auxiliary pin 300 with first bridge width 321, and second locking system includes second plug 410 with a second auxiliary pin 400 with a second bridge width 421. First plug 310 and second plug 410 are arranged to operate (i.e. allow the plug to rotate in the shell) with a key having a common bitting pattern, i.e., the same bitting pattern will position the shear pins of a lock having plug 310 and the sheer pins of a lock having plug 410 to allow rotation of the plug 310, 410. The same headed pin 220 (i.e., headed pins of the same dimensions) is also used in both locks. First key 346 and second key 446 have the same upper projection 248 to create a similar shear height 231 between upper projection 248 and shear line 139, and the first bridge width 321 is greater than the second bridge width 421. First key 346 includes a first upper edge width 349 and second key 446 includes a second upper edge width 449. First upper edge width 349 is less than the first bridge width 321, but greater than the second bridge width 421. Second upper edge width 449 is less than both first bridge width 321 and second bridge width 421. As such, first key 346 has access to first locking system 300 but does not have access to second locking system 400. That is, first upper edge width 349 is greater than second bridge width 421, thus preventing first key 346 from inserting completely into second plug 410. Second key 446 has access to both first locking system 300 and second locking system 400. That is, second upper edge width 449 is less than first bridge width 321, and less than second bridge width 421, allowing key 446 to insert completely into the plugs 310, 410 of both locking systems 300, 400. The process of varying the upper edge width 149 of key 146 allows certain keys to have access to a subset of locking systems.

Additionally, any of keys 146, 346, 446, may access a predicate locking system (see FIG. 1) wherein the predicate locking system includes a headed pin 220 or an auxiliary lower pin 32. That is, a key 146 configured to work with locking system 100 of the present disclosure, may also work with previous generations of locking systems; key 146 is backwards compatible. However, keys 46 of a predicate locking system (see FIG. 1) will not work with the locking system 100 of the current disclosure.

Now referring to FIGS. 15-20, key 146' and auxiliary pin 200' will be described. Key 146' is substantially similar to key 146, and auxiliary pin 200' is substantially similar to auxiliary pin 200, however, key 146' and auxiliary pin 200' include specific features to be keyed together. Auxiliary pin 200' may work with the previously described plugs and will work with headed pin 220, auxiliary drive pin 134 and auxiliary biasing spring 136. In various embodiments, key 146' works with auxiliary pin 200.

Key 146' includes blade 147' extending from bow 156 along longitudinal centerline 175'. Key 146' includes upper edge 160 which may include bitting (not shown, similar to FIG. 2) after a bitting manufacturing process is completed. Prior to bitting (when key 146' is a "key blank"), upper edge 160 has an upper edge width 149 which is nominally consistent along its length. Key 146' includes upper projection 248 positioned intermediate bow 156 and the tip (not shown) of the blade 147'. Key 146' includes slot 250' positioned adjacent upper projection 248. In this context, "adjacent" is inclusive of a slot 250' defined by a front wall 254 that transitions upwardly into the tapered wall 249 defining upper projection 248, and a slot that has a front wall 254 spaced 0.5, 1, 1.5, or 2.0 mm from the tapered wall 249 defining upper projection 248. Slot 250' is positioned longitudinally intermediate upper projection 248 and bow 156. Slot 250' is defined by the boundaries of the slot lower extent 251', tapered surface 249 extending upward to upper projection 248, and wall 255. Wall 255 is a substantially planar (i.e., nominally planar) surface which is nominally perpendicular along its height and width to the longitudinal centerline 175'. In this context, substantially means nominally. Wall 255 is defined at the terminal end of extension 257. Extension 257 extends forward from shoulder 157 and bow 156 and provides support to auxiliary pin 200', which will be explained in greater detail below. Extension 257 may include a tapered or curved edge 260 extending at least a portion of the distance between shoulder 157 or bow 156 and wall 255. A similar tapered or curved edge can be positioned opposite edge 260. These curved edges may be formed by a mill. In various embodiments, wall 255 has a width that is less than the upper edge width 149.

In the present embodiment, extension 257 extends forward along a center of upper edge 160 and is symmetrical about the key centerline 175' when viewed from a top view. In various embodiments, extension 257 is asymmetrical about key centerline 175' when viewed from a top view. In various embodiments, extension 257 extends forwardly and offset from longitudinal centerline 175' and the center of wall 255 is positioned offset from longitudinal centerline 175'.

Auxiliary pin 200' includes body 204 and cover 205 extending outward from body 204 at its upper extent. A circular collar 210 extends upward from cover 205 and includes a chamfered surface 211 around its upper edge. Opening 202 extends within collar 210 and cover 205 along auxiliary pin axis 270, and auxiliary pin axis 270 is positioned generally along the centerline of opening 202. Auxiliary pin axis 270 extends generally transverse of, and intersects, longitudinal centerline 175'. Auxiliary pin 200' also includes extensions 206 extending downward from body 204 and bridge 207 extending between extensions 206. Extensions 206 each include chamfered surfaces 208 at the lowest extent of extensions 206. Bridge 207 includes outward facing chamfer 212 on an outside surface of auxiliary pin 200' and an inward facing chamfer 213 on an inside surface of auxiliary pin 200'.

Auxiliary pin 200' also includes cutout, or receiving area 215 positioned within body 204. Cutout 215 is positioned adjacent bridge 207 and includes a pair of side walls 217 defining a cutout depth 218 and a top wall 214. Cutout 215 also includes a back wall 216 extending generally transverse cover 205. Cutout 215 is generally sized and positioned to contact back wall 255 of extension 257 during actuation of the lock by key 146'. Cutout 215 has a cutout profile, or receiving profile that is substantially congruent with the profile of back wall 255. In the present embodiment, substantially congruent means nominally congruent. Because of the complementary planar surfaces of back walls 216, 255, protrusion 257 works to stabilize and maintain the coaxiality of headed pin 220 and auxiliary pin 200'. In the present embodiment, cutout 215 is generally aligned along longitudinal centerline 175'. In various embodiments, when extension 257 is asymmetrical or not aligned along the longitudinal centerline 175, cutout 215 is modified so to accommodate the extension 257. In one example, when the extension 257 is positioned generally left of the longitudinal centerline 175' when viewed from a top view, cutout 215 will be manufactured into auxiliary pin 200' so that it is corresponding to the position of the extension 257.

When auxiliary pin 200' is in an engaged position with key 146', bridge 207 is in contact with slot 250', and cutout 215 contacts back wall 255. Extension 257 extends within cutout 215 and, in various embodiments as key 146' is turned, edge 260 contacts side wall 217. In various embodiments, cutout 215 is generally sized and shaped so that extension 257 and wall 255 are keyed to fit tightly. That is, the profile of cutout 215 is nominally larger than the profile of wall 255 (e.g. a small tolerance is created between the interface of cutout 215 and extension 257). Auxiliary pin 200' has a back wall distance 219 defined as the distance between the back wall 216 and the auxiliary pin central axis 270. Key 146' has an extension distance 221 defined as the distance between the center of the upper projection 248 and the wall 255. In the present embodiment, extension distance 221 is nominally greater than, or approximately equal to, back wall distance 219 (e.g. there is a small tolerance between extension distance 221 and back wall distance 219). When auxiliary pin 200' in an engaged position with key 146', bridge 207 is in contact with the bottom extent of slot 250', and back wall 216 engages wall 255. Wall 255 provides support to auxiliary pin 200' and prevents it from rotating forward or backward along the blade 147'.

Auxiliary pin 200' may be manufactured similarly to auxiliary pin 200. In various embodiments auxiliary pin 200 is manufactured using an injection molding process, and cutout 215 is removed using a milling process to create auxiliary pin 200'. In various embodiments, auxiliary pin 200' is manufactured using an injection molding process. Further, key 146' is manufactured similarly to key 146. That is, key 146' has upper protrusion 248 milled out of key 146', and slot 250 is subsequently removed from a position between bow 156 and protrusion 248. Curved edge 260 may be created using a milling process subsequent to the creation of slot 250 and protrusion 248. Curved edge 260 may be created using a side milling process. In various embodiments, the various milling and manufacturing processes on key 146' may be done in any order. For example, the curved edges 260 may be removed from the side of key 146' before slot 250'.

In various embodiments key 146' may be configured with varying extension distances 221 to provide access to various plugs with auxiliary pin 200'. In one example, first key 546 has first extension distance 521 configured to interface with first auxiliary pin 500 which has first back wall distance 519, and the first auxiliary pin 500 is positioned in a first plug (not shown). Second key 646 has second extension distance 621 configured to interface with second auxiliary pin 600 which has second back wall distance 619, and the second auxiliary pin 600 is positioned in a second plug (not shown). First extension distance 521 is greater than second extension distance 621, first back wall distance 519 is greater than second back wall distance 619, first extension distance 521 is nominally greater than first back wall distance 519, second extension distance 621 is nominally greater than second back wall distance 619, and first back wall distance 519 is greater than second extension distance 621. When first key 546 is inserted into first plug with first auxiliary pin 500, first bridge (not shown) of first auxiliary pin 500 will sit within first slot 550. Headed pin 220 will contact first protrusion 548, and first key 546 permits first plug to rotate relative to a shell (not shown). When second key 646 is inserted into the second plug, second bridge (not shown) of second auxiliary pin 600 will sit within second slot 650. Headed pin 220 will contact second protrusion 648, and second key 646 permits second plug to rotate relative to a shell (not shown).

When first key 546 is inserted into the second plug with the second auxiliary pin 600, first key 546 may rotate the second plug relative to a shell because the second back wall distance 619 of the second auxiliary pin 600 is less than the first extension distance 521, and the bridge of the second auxiliary pin 600 can rest within slot 550. When second key 646 is inserted into the first plug with the first auxiliary pin 500, second key 646 is prohibited from rotating the first plug relative to a shell because the first back wall distance 519 of the first auxiliary pin 500 is greater than the second extension distance 621. The bridge of auxiliary pin 500 will therefore be unable to rest within slot 650 and instead will rest upon extension 257, and auxiliary pin 500 will push the headed pin 220 up so that it extends across the shear line 139 (FIG. 8). Key 146' and auxiliary pin 220' may then be sized and shaped so that a subset of keys may contain extensions 257 creating varying extension distances 221 so that various keys may access a subset of plugs with varying auxiliary pins 200' with varying back wall distances 219.

Within this disclosure, when the term “substantially similar” is used, the disclosure may be interpreted to mean “nominally congruent” or the like.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A lock system comprising:

a plug comprising an auxiliary pin chamber and a keyway, the auxiliary pin chamber extending from a perimeter of the plug to meet the keyway;

a shell configured to receive the plug, an interface between the shell and the plug defining a shear line, the shell comprising an auxiliary tumbler chamber, the auxiliary tumbler chamber aligning with the auxiliary pin chamber when the lock system is in a neutral position;

an auxiliary tumbler comprising:

an auxiliary driver pin positioned at least partially in the auxiliary tumbler chamber of the shell;

a headed pin, the auxiliary driver pin biased against the headed pin to a normally biased position of the auxiliary tumbler;

an auxiliary pin comprising an opening and a pin body, the headed pin received in the opening; and in the normally biased position, the auxiliary tumbler extends across the shear line to prevent rotation of the plug in the shell; and a key comprising a bow and a blade extending longitudinally from the bow along a key blade centerline to a tip, the key comprising a protrusion extending from an upper edge of the blade and a slot, the slot sized to receive the pin body of the auxiliary pin, with the auxiliary pin body positioned in the slot, the protrusion of the key is aligned with the opening in the auxiliary pin, whereby positioning the key so that the auxiliary pin is received in the slot of the key raises the auxiliary tumbler from the normally biased position, wherein the pin body comprises a pair of extensions, and a bridge extending a bridge width between the extensions, and wherein the upper edge of the blade of the key comprises an upper edge width, and the upper edge width is less than the bridge width.

2. The lock system of claim 1, wherein, with the auxiliary pin body positioned in the slot of the key, the protrusion of the key is positioned to actuate the headed pin relative to the auxiliary pin.

3. The lock system of claim 2, wherein, with the auxiliary pin body positioned in the slot of the key, the auxiliary tumbler is positioned to allow rotation of the plug relative to the shell.

4. The lock system of claim 1, wherein when the auxiliary pin body is received by the slot, a bottom of the headed pin contacts the protrusion of the key.

5. The lock system of claim 4, wherein, with the auxiliary pin body positioned in the slot of the key, the auxiliary tumbler is positioned to allow rotation of the plug relative to the shell.

6. The lock system of claim 1, wherein, with the auxiliary pin body positioned in the slot of the key, the auxiliary tumbler is positioned to allow rotation of the plug relative to the shell.

7. The lock system of claim 1, wherein the auxiliary driver pin is biased directly against the headed pin.

8. The lock system of claim 1, wherein the slot receives the bridge when the pin body is received in the slot.

9. A lock system comprising:

a key comprising a bow, and a blade extending longitudinally from the bow along a key blade centerline to a tip, the blade comprising an upper edge, wherein the upper edge comprises bitting, a protrusion extending above the bitting, the protrusion positioned intermediate the bitting and the bow, a slot disposed intermediate the protrusion and the bow, the protrusion extending to a height above the slot;

an auxiliary pin including an opening and a pin body, wherein the pin body comprises a pair of extensions separated by a bridge having a bridge width;

a headed pin, the headed pin received within the auxiliary pin opening, and the headed pin and auxiliary pin moveable relative to one another;

a plug comprising a keyway, the keyway sized and shaped to receive the blade of the key so that the bitting mates with a tumbler stack to unlock the lock system, a chamber in the plug sized and shaped to receive the auxiliary pin and the headed pin; and when the key is completely inserted into the keyway, the protrusion contacts the headed pin, and the auxiliary pin is received in the slot.

10. The lock system of claim 9, wherein the upper edge of the blade comprises an upper edge width, and the upper edge width is nominally equal to, or less than, the width of the bridge width; and the upper edge of the blade is configured to be received between the pair of extensions.

11. The lock system of claim 9, wherein, with the auxiliary pin body positioned in the slot of the key, the protrusion of the key is positioned to actuate the headed pin relative to the auxiliary pin.

12. The lock system of claim 9, wherein when the auxiliary pin body is received by the slot, a bottom of the headed pin contacts the protrusion of the key.

13. The lock system of claim 9, wherein, with the auxiliary pin body positioned in the slot of the key, the auxiliary tumbler is positioned to allow rotation of the plug relative to the shell.

14. A lock system, comprising:

a key comprising a bow, and a blade extending longitudinally from the bow along a key blade centerline to a tip, the blade comprising an upper edge, wherein the upper edge comprises a bitting, a protrusion extending above the bitting, the protrusion positioned intermediate the bitting and the bow, a slot disposed intermediate the protrusion and the bow, the slot defined by a bottom extent, a front wall extending upward from the bottom extent to the protrusion, and a rear wall, the rear wall having a rear wall profile;

an auxiliary pin comprising a pin body, the pin body comprising a receiving area with a receiving area profile, wherein the pin body further comprises a pair of extensions separated by a bridge having a bridge width;

a plug comprising a keyway, the keyway sized and shaped to receive the blade of the key so that the bitting mates with a tumbler stack to unlock the lock system, a chamber in the plug sized and shaped to receive the auxiliary pin; and the rear wall profile and the receiving area profile are substantially congruent, whereby the rear wall is configured to stabilize the auxiliary pin when the bitting mates with the tumbler stack to unlock the lock system.

15. The lock system of claim 14, wherein the auxiliary pin further comprises an opening, and a headed pin is configured to be received within the auxiliary pin opening, and the headed pin and the auxiliary pin are moveable relative to one another.

16. The lock system of claim 15, wherein the rear wall acts as a stabilizing surface for the auxiliary pin to maintain substantial coaxiality with the headed pin and the protrusion.

17. The lock system of claim 16, wherein the rear wall is substantially planar.

* * * * *